(12) United States Patent
Theethira Kushalappa et al.

(10) Patent No.: US 9,840,219 B2
(45) Date of Patent: Dec. 12, 2017

(54) HYBRID UNDERRUN PROTECTION DEVICE

(71) Applicant: SABIC Global Technologies B.V., Bergen op Zoom (NL)

(72) Inventors: Poovanna Theethira Kushalappa, Bangalore (IN); Sandeep Chandrakant Kulkarni, Bangalore (IN); Arunachala Parameshwara, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/122,337

(22) PCT Filed: Feb. 26, 2015

(86) PCT No.: PCT/IB2015/051438
§ 371 (c)(1),
(2) Date: Aug. 29, 2016

(87) PCT Pub. No.: WO2015/128832
PCT Pub. Date: Sep. 3, 2015

(65) Prior Publication Data
US 2016/0368443 A1    Dec. 22, 2016

Related U.S. Application Data

(60) Provisional application No. 61/946,419, filed on Feb. 28, 2014.

(51) Int. Cl.
*B60R 19/56* (2006.01)
*B62D 29/04* (2006.01)

(52) U.S. Cl.
CPC ............ *B60R 19/56* (2013.01); *B60R 19/565* (2013.01); *B62D 29/043* (2013.01)

(58) Field of Classification Search
CPC ....... B60R 19/56; B60R 19/565; B60R 19/04; B60R 19/18; B60R 2019/1806;
(Continued)

(56) References Cited

U.S. PATENT DOCUMENTS 3,706,468 A * 12/1972 Yoviene ................. B60R 19/18
                                                                   267/140
4,066,285 A *  1/1978 Hall ......................... B60R 13/04
                                                                   280/770
(Continued)

FOREIGN PATENT DOCUMENTS

CN           2759854 Y      2/2006
CN         201276086 Y      7/2009
(Continued)

OTHER PUBLICATIONS

FUPS—Frontal Uderrun Protection System; Volvo; http://www.volvobuses.com/bus/india/en-in/volvogroup/Safety/FUPS/Pages/FUPS.aspx; Jul. 19, 2016.
(Continued)

*Primary Examiner* — Gregory Blankenship
(74) *Attorney, Agent, or Firm* — Cantor Colburn LLP

(57) ABSTRACT

An underrun protection device for a vehicle comprises a hybrid beam formed of a preform member and a thermoplastic formed onto the preform member, and configured to attach to a vehicle attachment element, the hybrid beam comprises the preform member defines a channel and is configured to couple with the vehicle and extend along a side of the vehicle parallel with a centerline of the vehicle, with an opening of the channel oriented away from the centerline, wherein the channel is defined by an inside surface at least partially facing away from the centerline, and an outside surface at least partially facing the centerline; and a thermoplastic beam formed of the thermoplastic and shaped to conform to the channel of the preform member, the thermo-
(Continued)

plastic beam at least partially abutting the inside surface of the channel.

13 Claims, 14 Drawing Sheets

(58) Field of Classification Search
CPC .... B60R 2019/1833; B60R 2019/1846; B60R 2021/002; B60R 2021/0069
USPC ........ 296/187.12, 184.1; 293/102, 120–122, 293/132, 133, 146, 151, 152, 155
See application file for complete search history.

(56) References Cited

U.S. PATENT DOCUMENTS

| | | | |
|---|---|---|---|
| 4,072,334 A * | 2/1978 | Seegmiller | B60R 19/18 114/219 |
| 4,569,865 A * | 2/1986 | Placek | B29C 44/12 264/328.1 |
| 4,941,701 A * | 7/1990 | Loren | B60R 19/18 293/109 |
| 5,056,840 A * | 10/1991 | Eipper | B60R 19/18 293/120 |
| 5,154,462 A | 10/1992 | Carpenter | |
| 5,810,406 A * | 9/1998 | Reid, Jr. | B29C 47/0019 293/120 |
| 6,547,317 B1 | 4/2003 | Cheron et al. | |
| 6,672,635 B2 | 1/2004 | Weissenborn et al. | |
| 6,746,061 B1 | 6/2004 | Evans | |
| 7,370,893 B2 | 5/2008 | Tamada et al. | |
| 7,533,912 B2 | 5/2009 | Frederick et al. | |
| 7,628,444 B2 | 12/2009 | Cormier et al. | |
| 7,766,403 B2 | 8/2010 | Alvarsson et al. | |
| 7,959,197 B2 | 6/2011 | Agrahari et al. | |
| 8,141,918 B2 | 3/2012 | Miller et al. | |
| 2002/0043809 A1* | 4/2002 | Vismara | B60R 19/18 293/133 |
| 2002/0121787 A1* | 9/2002 | Tarahomi | B29D 99/0089 293/120 |
| 2003/0111852 A1* | 6/2003 | Carley | B29C 44/1228 293/109 |
| 2003/0189343 A1* | 10/2003 | Evans | B60R 19/18 293/120 |
| 2004/0119303 A1* | 6/2004 | Gollungberg | B60R 19/56 293/132 |
| 2005/0087997 A1* | 4/2005 | Zander | B29C 44/3419 293/102 |
| 2006/0119116 A1* | 6/2006 | Goertz | B60R 19/565 293/132 |
| 2007/0176439 A1* | 8/2007 | Meltzer | B60R 19/44 293/102 |
| 2007/0257497 A1 | 11/2007 | Heatherington et al. | |
| 2007/0284896 A1* | 12/2007 | Wakabayashi | B60R 19/18 293/120 |
| 2008/0116702 A1* | 5/2008 | Enz | B60R 19/56 293/128 |
| 2008/0129060 A1* | 6/2008 | Schutt | B60R 19/02 293/136 |
| 2009/0001768 A1* | 1/2009 | Saitou | B60R 19/56 296/204 |
| 2010/0102577 A1* | 4/2010 | Ginja | B60R 19/34 293/102 |
| 2010/0156122 A1* | 6/2010 | Saitou | B60R 19/56 293/132 |
| 2011/0049915 A1 | 3/2011 | Kokubo | |
| 2011/0101714 A1* | 5/2011 | Bator | B60R 19/18 293/132 |
| 2012/0049546 A1 | 3/2012 | Chickmenahalli et al. | |
| 2013/0053501 A1 | 2/2013 | Kim et al. | |
| 2015/0367798 A1* | 12/2015 | Bobba | B60R 19/56 293/120 |
| 2016/0059811 A1* | 3/2016 | Vermeys | B60R 19/42 293/128 |
| 2016/0090056 A1* | 3/2016 | Hundley | B60R 19/18 293/120 |
| 2016/0311467 A1* | 10/2016 | Johnston | B60R 19/18 |
| 2016/0368443 A1* | 12/2016 | Theethira Kushalappa | B62D 29/043 |

FOREIGN PATENT DOCUMENTS

| | | |
|---|---|---|
| EP | 1197398 A2 | 4/2002 |
| EP | 2038145 B1 | 6/2007 |
| EP | 1935724 B1 | 4/2010 |
| JP | 2003312404 A | 11/2003 |
| JP | 4072434 B2 | 4/2008 |
| JP | 2008230502 | 10/2008 |
| JP | 2012224275 A | 11/2012 |
| RU | 2207261 C1 | 6/2003 |
| WO | 2007129959 A1 | 11/2007 |
| WO | 2009041866 A1 | 4/2009 |
| WO | 2012081176 A1 | 6/2012 |
| WO | 2013002010 A1 | 1/2013 |

OTHER PUBLICATIONS

International Publication No. 2013002010(A1); Date of Publication: Jan. 3, 2013; Emglish Abstract; 1 Page.
International Search Report for International Application No. PCT/IB2015/051438; International Filing Date: Feb. 26, 2015; dated Oct. 28, 2015.
Japanese Patent No. 2003312404(A); Date of Publication: Nov. 6, 2003; Machine Translation; 8 Pages.
Japanese Patent No. 2008230502(A); Date of Publication: Oct. 2, 2008; Machine Translation; 12 Pages.
Japanese Patent No. 2012224275(A); Date of Publication:Nov. 15, 2012; Machine Translation; 10 Pages.
Japanese Patent No. 4072434(B2); Date of Publication: Apr. 9, 2008; English Abstract; 1 Page.
Russian Patent No. 2207261(C1); Date of Publication: Jun. 27, 2003; Machine Translation; 13 Pages.
Written Opinion of the International Searching Authority for International Application No. PCT/IB2015/051438; International Filing Date: Feb. 26, 2015; dated Oct. 28, 2015.
Chinese Patent No. CN201276086(Y); Date of Publication: Jul. 22, 2009; Machine Translation; 3 Pages.
Chinese Patent No. CN2759854(Y); Date of Publication: Feb. 22, 2006; Machine Translation; 4 Pages.

* cited by examiner

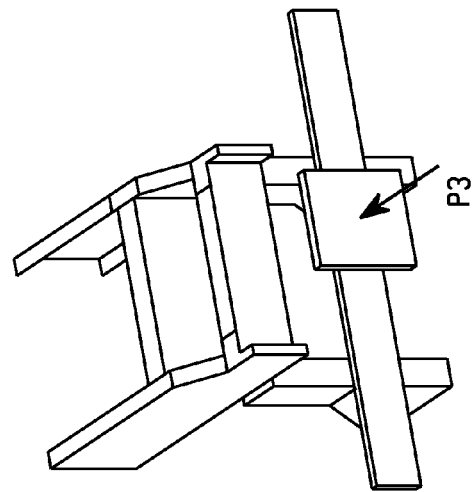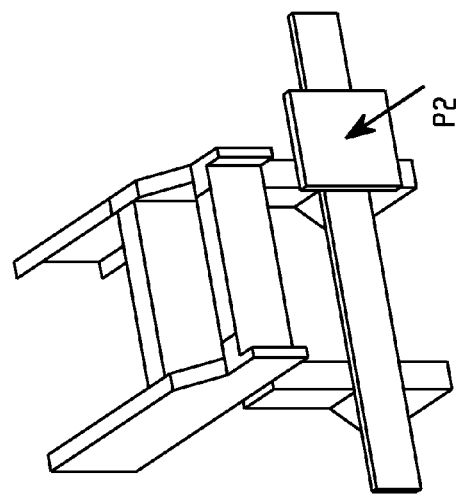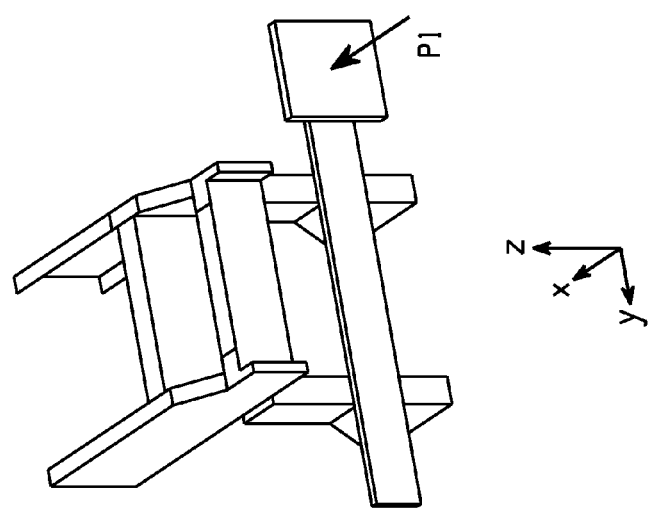
Fig. 13

HYBRID UNDERRUN PROTECTION DEVICE

CROSS REFERENCE TO RELATED APPLICATIONS

This application is a 371 of International Application No PCT/IB2015/051438, filed Feb. 26, 2015, which claims the benefit of Provisional Application No. 61/946,419, filed Feb. 28, 2014, both of which are incorporated by reference in their entirety herein.

BACKGROUND

In vehicular collisions, particularly between two vehicles of differing heights, a smaller or shorter vehicle can underrun a larger or taller vehicle, having a higher bumper or frame rail. Collisions of this type can result in severe injury and/or fatality of occupants of the smaller vehicle, as well as significant damage to the smaller vehicle as the smaller vehicle can be crushed under the larger one. Underrun protection devices (UPD's) can be positioned below a front bumper, a side rail, or a rear bumper of a larger vehicle to stop or reduce the occurrence of underrun collisions and/or to reduce the extent to which the smaller vehicle underruns the larger vehicle. These UPD's can be made of materials having relatively high mass, such as steel, and using heavy equipment, such as cranes and hoists, can be used in the installation or assembly operations associated with these UPD's. Labor intensive assembly operations, such as welding, can be used to install these UPD's onto vehicle frames.

UPD's are regulated in the European Union by the Economic Commission for Europe of the United Nations (ECE) under Regulation No. 93 (ECE-R93) for Front UPD's, Regulation No. 58 (ECE-58) for Rear UPD's, and Regulation No. 73 for Lateral Protection Devices, and vehicles sold in regions following those regulations must meet certain performance parameters set forth in those regulations. In the United States of America, the National Highway Traffic Safety Administration has a legislative mandate under Title 49 of the United States Code, Chapter 301, Motor Vehicle Safety, to issue Federal Motor Vehicle Safety Standards and Regulations (FMVSS) to which manufacturers of motor vehicle and equipment items must conform and certify compliance. In the United States, UPD's are regulated under FMVSS by Standards 223 for Front UPD's and 224 for Rear UPD's. In India, the Automotive Industry Standards Committee (AIS) has established similar standards under AIS-069 for UPD's. The Indian standards align with the ECE regulations. A summary of these performance parameters are provided in Table 1. The loads are applied longitudinally using a ram. The locations for the load applications are illustrated in FIG. 13.

TABLE 1

Summary of UPD Performance Parameters in the United States of America and Europe

| Test Load (kN) | FMVSS Standard 223 & Standard 224 | ECE-R93 * | ECE-R58 ** | ECE-R73 |
|---|---|---|---|---|
| Outer edge P1 | 50 kN | 80 kN | 25 kN | 1 kN |
| Center P3 | 50 kN | 80 kN | 25 kN | |
| Off Center P2 | 100 kN | 160 kN | 100 kN | |
| Allowed deflection | 125 mm | 400 mm | | 30 mm in front of wheels, 300 mm elsewhere |
| Height | 560 mm | 400 mm | 550 mm | |

The abbreviation "kN" means kiloNewton. The abbreviation "mm" means millimeter.
* These test loads apply to vehicles with a Gross Vehicle Mass (GVM) > 16 metric tons (t), for other vehicles, lower values are permitted and are a function of vehicle GVM.
** These test loads apply to vehicles with a Gross Vehicle Mass (GVM) > 20 t, for other vehicles lower values are permitted and are a function of vehicle GVM.
Points P1 are located up to 200 mm from the longitudinal planes tangential to the outermost points of the tires on the front axle, excluding the bulging of the tires close to the ground; points P2 are symmetrical to the median longitudinal plane of the vehicle at a distance from each other of 700 mm to 1,200 mm inclusive.
The height above the ground of points P1 and P2 shall not, however, exceed 445 mm when the vehicle is unladen. P3 is in the vertical longitudinal median plane of the vehicle.

These various tests underscore the importance of these devices. Accordingly, there remains a need for lightweight, easy to assemble, underrun protection devices which can safeguard smaller vehicles in the event of a collision with a larger vehicle. To be sold in certain regions, such devices should meet the performance standards ECE-R93, ECE-R58, ECE-R73 and similar worldwide standards.

SUMMARY

Disclosed herein are underrun protection devices for vehicles, and method for making the same.

In an embodiment, an underrun protection device for a vehicle can comprise: a hybrid beam formed of a preform member and a thermoplastic formed onto the preform member, and configured to attach to a vehicle attachment element, the hybrid beam comprising the preform member, which defines a channel and is configured to couple with the vehicle and extend along a side of the vehicle parallel with a centerline of the vehicle, with an opening of the channel oriented away from the centerline, wherein the channel is defined by an inside surface at least partially facing away from the centerline, and an outside surface at least partially facing the centerline; and a thermoplastic beam formed of the thermoplastic and shaped to conform to the channel of the preform member, the thermoplastic beam at least partially abutting the inside surface of the channel, the thermoplastic beam defining a pattern of interstices defined by ribs, with the ribs extending perpendicular to the centerline; wherein the hybrid beam is configured to couple with the vehicle at least partially below an underbody of the vehicle, to at least partially occlude a passage to a space under the underbody from outside of the vehicle.

In one embodiment, a vehicle can comprise at least one of a front bumper, a rear bumper, and a side rail; and an underrun protection device, wherein the underrun protection device is positioned below one of the front bumper, the rear bumper, or the side rail.

In one embodiment, a method of manufacturing an underrun protection device can comprise: forming an hybrid beam configured for attachment to a vehicle attachment element comprising a preform member including a channel and an inside surface; and a thermoplastic beam, wherein the thermoplastic beam comprises a mating portion, wherein the thermoplastic beam and the preform member have complementary mating shapes such that a portion of the mating portion is adjacent to the inside surface of the channel, and wherein the thermoplastic beam is affixed to the preform member.

The above described and other features are exemplified by the following figures and detailed description.

BRIEF DESCRIPTION OF THE DRAWINGS

Refer now to the figures, which are exemplary embodiments, wherein like elements are numbered alike.

FIG. 13 is an illustration of a impact locations for testing standards.

Figure 1:
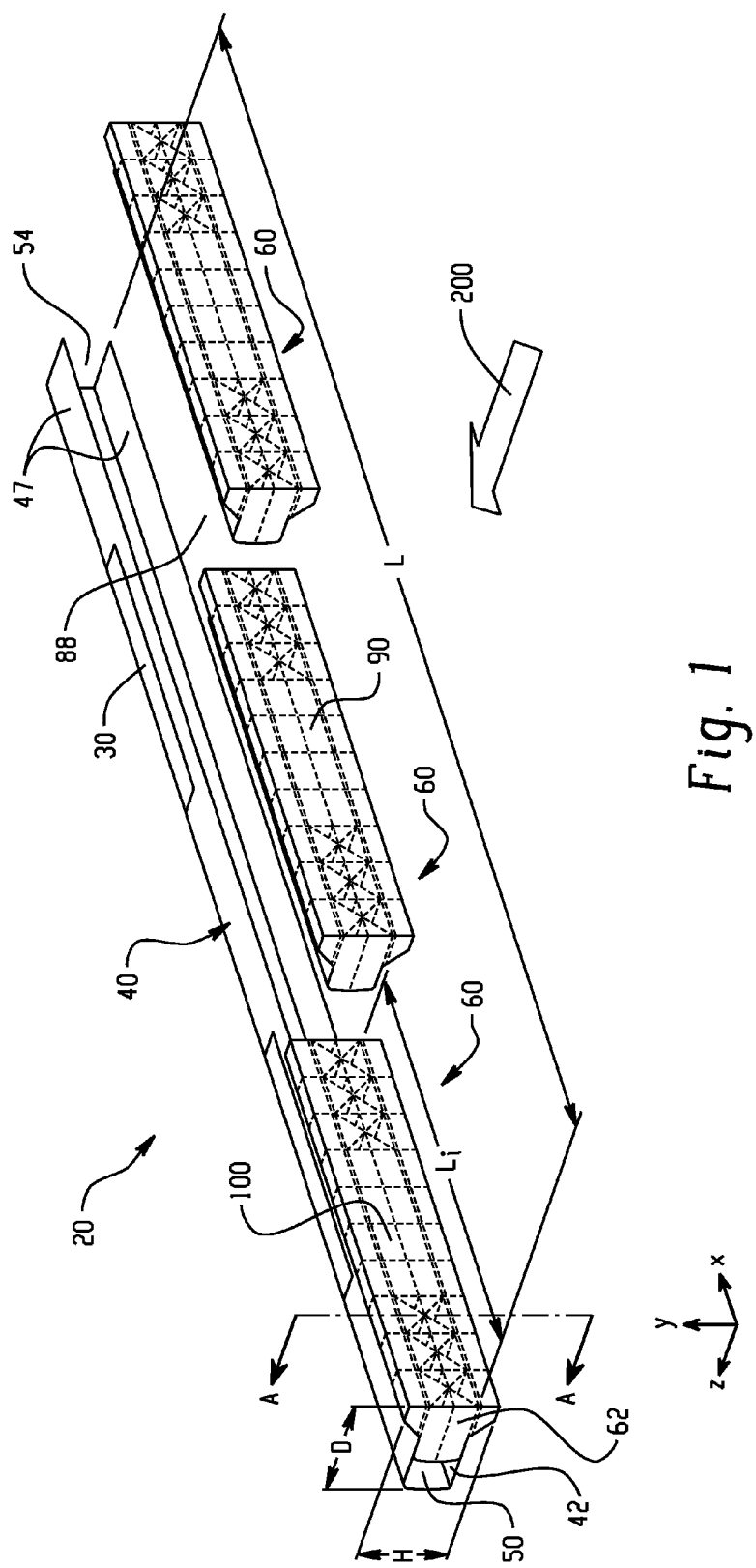
FIG. 1 is an illustration depicting a hybrid beam.

The figures are exemplary only and are not drawn to a particular scale.

DETAILED DESCRIPTION

Disclosed are light-weight (e.g., as compared to steel systems) hybrid Underrun Protection Devices (UPD's). As used herein, the term "hybrid" refers to a multi-material system (e.g., formed from two or more materials). These devices can be a single unit or can be formed from several components, which can be used in combination to form the UPD and meet established safety requirements. The presently disclosed components can be manufactured, shipped, and then assembled into an UPC, enabling more compact, facile shipping. In comparison to other UPD's, hybrid UPD's can be lighter, and easier to manufacture, handle, and, assemble, and can reduce injury to vehicle occupants and/or reduce damage to vehicles in the event of a collision.

As used herein, the term "vehicle attachment element" can refer to a structural member of a vehicle, including but not limited to a frame, frame extension, a bracket attached to the vehicle frame, or any element that can provide mechanical communication with the vehicle frame.

An UPC can include a beam. The beam can be a hybrid beam. A bracket of an UPC can be a hybrid bracket. A hybrid beam can include a material such as metal, polymer, reinforced composite polymer, or a combination comprising at least one of the foregoing. As used herein a metal can include steel, aluminum, magnesium, or other structural metal. As used herein, a reinforced composite polymer can include a polymer and reinforcing material, such as fibers, (continuous, chopped, woven, and the like) formed of aramid, carbon, basalt, glass, plastic, metal (e.g. steel, aluminum, magnesium), quartz, boron, cellulose, liquid crystal polymer, high tenacity polymer (e.g., polypropylene, polyethylene, poly(hexano-6-lactam), poly[imino(1,6-dioxohexamethylene) imnohexamethylene]), thermoplastic polymer, thermoset polymer, or natural fibers, as well as combinations comprising at least one of the foregoing.

The beam can have a long dimension, defining the length (L) of the beam (measured in the x-axis dimension in the attached figures). Two other dimensions can represent the height (H) and depth (D) of the hybrid beam. The height of the hybrid beam can extend in the height dimension of the vehicle (measured in the y-axis dimension in the attached figures). The depth can extend a direction orthogonal to a plane defined by the length and depth (measured in the z-axis dimension in the attached figures).

The beam can have a size (e.g., length, height, and depth) based upon the size of the vehicle, the area desired to be protected from underrun of another vehicle, and the structural integrity of the beam. For example, the beam length can be 1,000 millimeters (mm) to 3,000 mm, for example, 1,500 mm to 2,500 mm, or 1,750 mm to 2,000 mm. The beam can have a height of 75 mm to 1,000 mm, for example, 80 mm to 300 mm, or, 100 mm to 120 mm. The beam can have a depth of 25 mm to 300 mm, for example, 50 mm to 200 mm, or, 80 mm to 200 mm. The preform member can have a thickness of 1 mm to 20 mm, for example, 2 mm to 5 mm, or, 2 mm to 3 mm. A thermoplastic beam section can provide additional structural integrity to the beam while maintaining a low weight in comparison to a steel beam. A thermoplastic beam section can have a height of 75 mm to 500 mm, for example, 150 mm to 400 mm, or, 250 mm to 325 mm. A thermoplastic beam section can have a depth of 50 mm to 600 mm, for example, 150 mm to 400 mm, or, 200 mm to 300 mm.

An UPD system can include a bracket. The bracket can be a hybrid bracket. The bracket can attach a beam to a vehicle attachment element. The bracket can include a material such as metal, polymer, reinforced composite polymer, or a combination comprising at least one of the foregoing. A hybrid bracket can reduce the weight and cost of an UPD, and improve the ease of assembling an UPD to a vehicle.

The bracket can have a height (H), a length (L), and a depth (D). The size of the bracket can be varied depending on the desired structural characteristics of the UPD. The size of the bracket can vary based on the category of vehicle to which the bracket is to be attached. A hybrid bracket can have a length of 50 mm to 500 mm, for example, 100 mm to 300 mm, or, 150 mm to 200 mm.

As described herein the dimensions of elements of an UPD, such as the thermoplastic beam, mating portion, reinforcing plate, support sleeve, and preform member, will coincide with the height, length, and depth dimensions of the hybrid beam where the term "length" refers to a distance measured along an x-axis dimension in the attached figures, the term "height" refers to a distance measured along a y-axis dimension in the attached figures, and the term "depth" refers to a distance measured along a z-axis dimension in the attached figures.

FIG. 1 illustrates a hybrid beam 20 which can have a length, L, as measured in the x-axis dimension, and height, H, as measured in the y-axis dimension. The hybrid beam 20 can have a depth, D. The hybrid beam 20 can include a preform member 40, and thermoplastic beams 60. A thermoplastic beam 60 can include a mating portion 62. A thermoplastic beam 60 can include a reinforcing plate 100. A reinforcing plate 100 can be disposed along the front side of the mating portion 62. A mating portion 62 can have a length, $L_t$, as measured in the x-axis direction. A reinforcing plate 100 can have a length, $L_t$, as measured in the x-axis direction. The preform member 40 can have a "U" shaped cross section such that it can have two side walls 47 and a connecting wall 50 disposed between the two side walls to form a channel 42. The open side 54 of the preform member can face the back side 88 of the thermoplastic beams 60. Both the open side 54 of the channel 42, and the front side 90 of the thermoplastic beam, can face in a direction opposite to the direction of impact 200. The hybrid beam 20 can include beam reinforcements 30. The beam reinforcements 30 can have a "U" cross-sectional shape complementing the preform member 40. The beam reinforcements 30 can fit around portions of the outer surface of the preform member 40.

Figure 2:
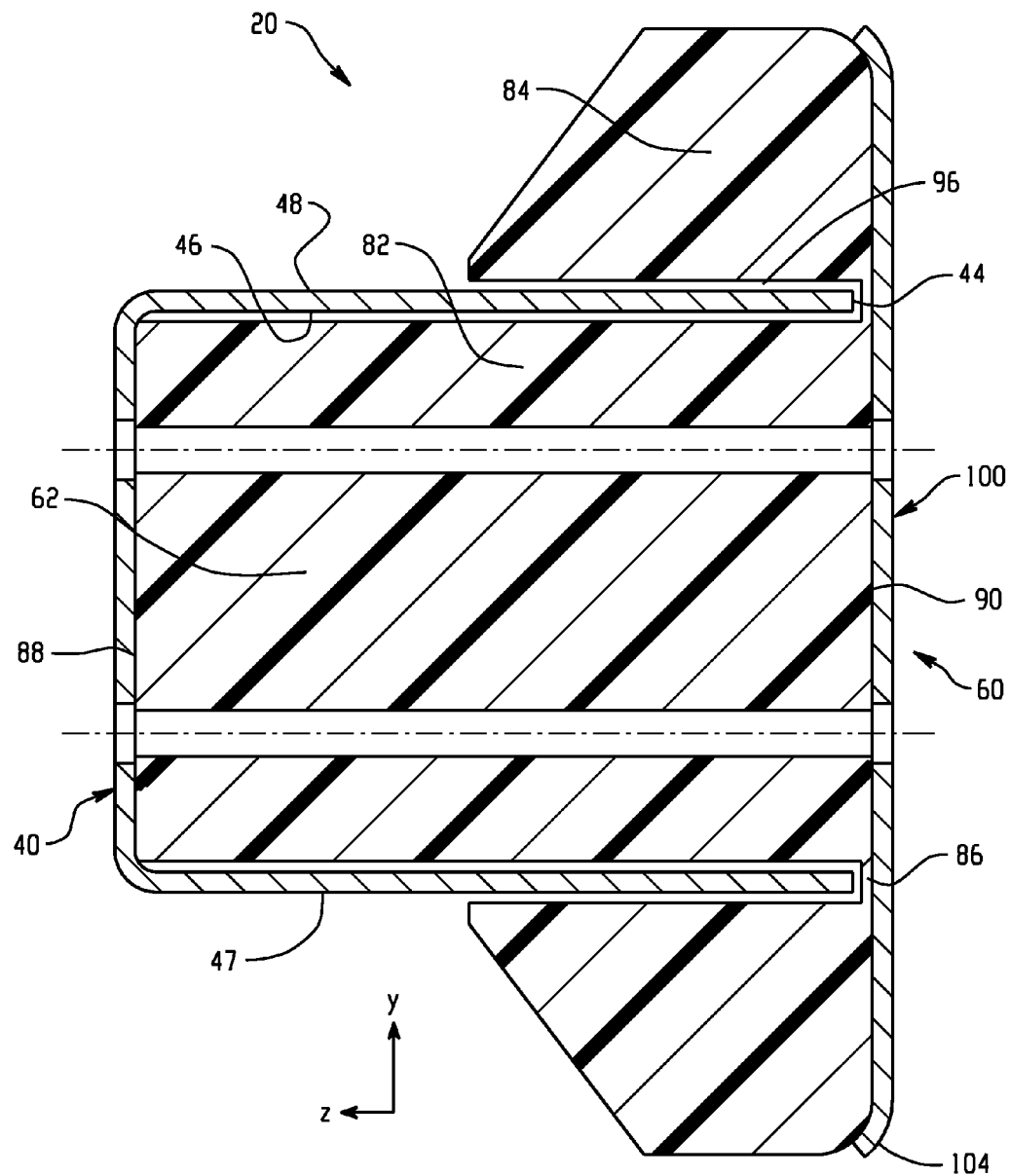
FIG. 2 is an illustration depicting a cross-sectional view of the hybrid beam of FIG. 1 taken along the A-A plane.

FIG. 2 depicts the A-A cross-section of the hybrid beam 20 of FIG. 1. The back side 88 of the central portion 82 of the mating portion 62 can be complementarily shaped to fit within the "U" shaped channel of the preform member 40. The thermoplastic beam 60 can extend along the inside surface 46 of the preform member 40. Two peripheral portions 84 of the mating portion 62 can be connected to the central portion 82 by a section 86 (e.g., a thin plastic section), disposed between the reinforcing plate 100 and the end 44 of side walls 47. The peripheral portions 84 of the mating portion 62 extend a distance along the outside surface 48 of the preform member 40 in the depth dimension (measured along the z-axis). A reinforcing plate 100, having curved edges 104, can be disposed along the front side 90 of the mating portion 62.

Figure 3:
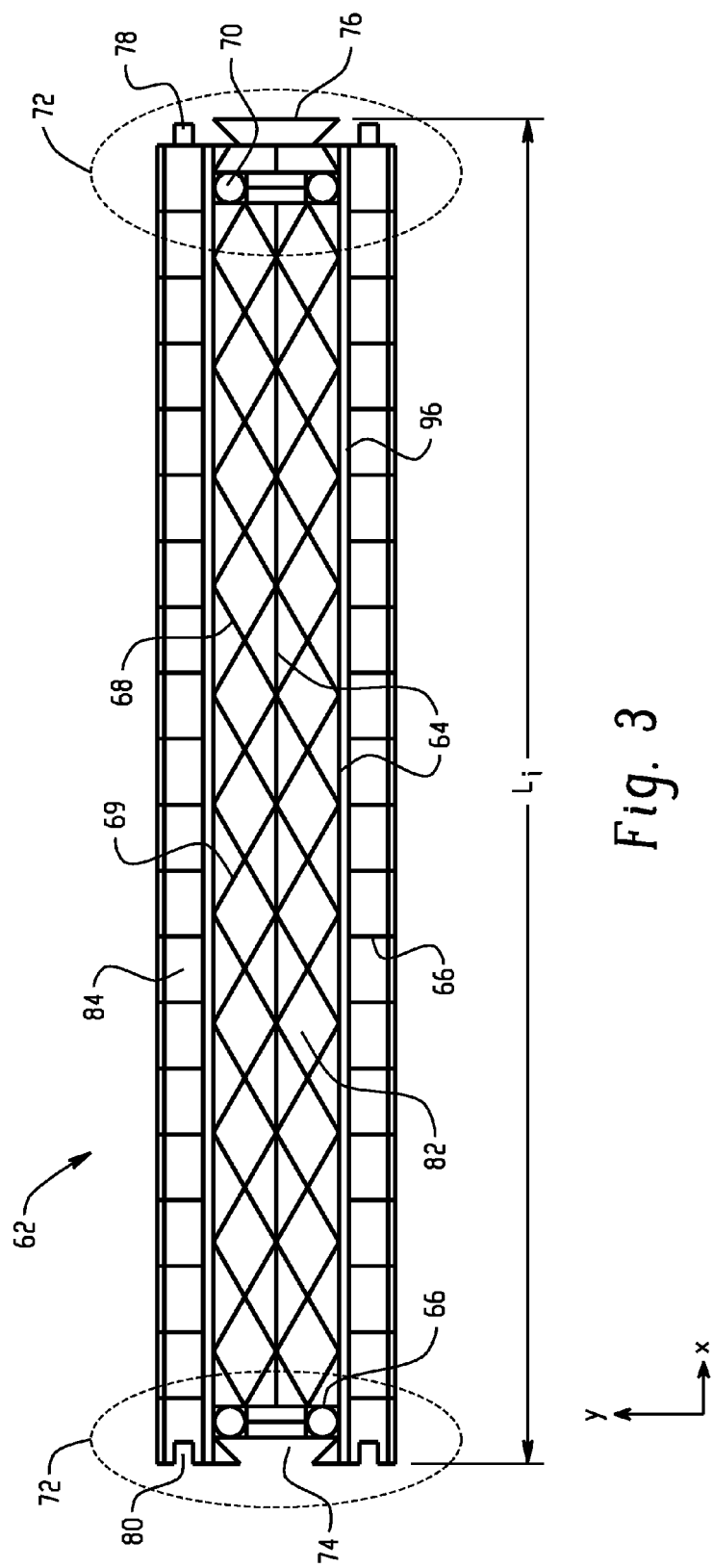
FIG. 3 is an illustration of a back view of a mating portion of a thermoplastic beam.

FIG. 3 depicts a back view of a mating portion 62 of the thermoplastic beam section 60. Attachment features 74, 76, 78, 80 can be disposed at end portion 72. The attachment features 74, 76, 78, 80 can be used to hold two adjacent thermoplastic beam sections together in an end-to-end fashion. The attachment features can include a shaped opening 74 and a complementary shaped and corresponding extension 76 that form a dove-tail like connection. The attachment features 74, 76, 78, 80 can include a protrusion 78 that can engage a corresponding recess, channel, or opening 80. The mating portion 62 can have longitudinal ribs 64. The mating portion 62 can have vertical ribs 66. The mating portion 62 can have diagonal ribs 68, 69. A central longitudinal rib 64 can bisect the central portion of the thermoplastic beam 60 along the length dimension. Longitudinal ribs 64 can define channels 96. Channels 96 can delineate the outer portion 84 from the central portion 82 of the mating portion 62. First diagonal ribs 68 can be positioned at an angle, e.g., approximately 30°, from a central longitudinal rib 64 and can have an inclining orientation, having a positive slope in the x-y plane. Second diagonal ribs 69 can be oriented at an angle, e.g., approximately 30°, from a central longitudinal rib 64, opposite the first angle, having a negative slope in the x-y plane. The first diagonal rib 68 and second diagonal ribs 69 can intersect one another along a line in the depth dimension, forming an "X" like cross-sectional shape in the x-y plane. The diagonal ribs can be uniformly spaced throughout the length of the mating portion 62. The mating portion 62 can have outer portions 84. The outer portions 84 can have vertical ribs 66. The vertical ribs 66 can be uniformly spaced throughout the length of the mating portion 62. Vertical ribs 66 extend between two channels 96 and form pocket walls 94 around holes 70. Holes 70 can extend through the mating portion 62. Holes 70 can be used in joining the mating portion 62 to a preform member 40 and/or to a reinforcing plate 100, such as with a mechanical attachment.

Figure 4:
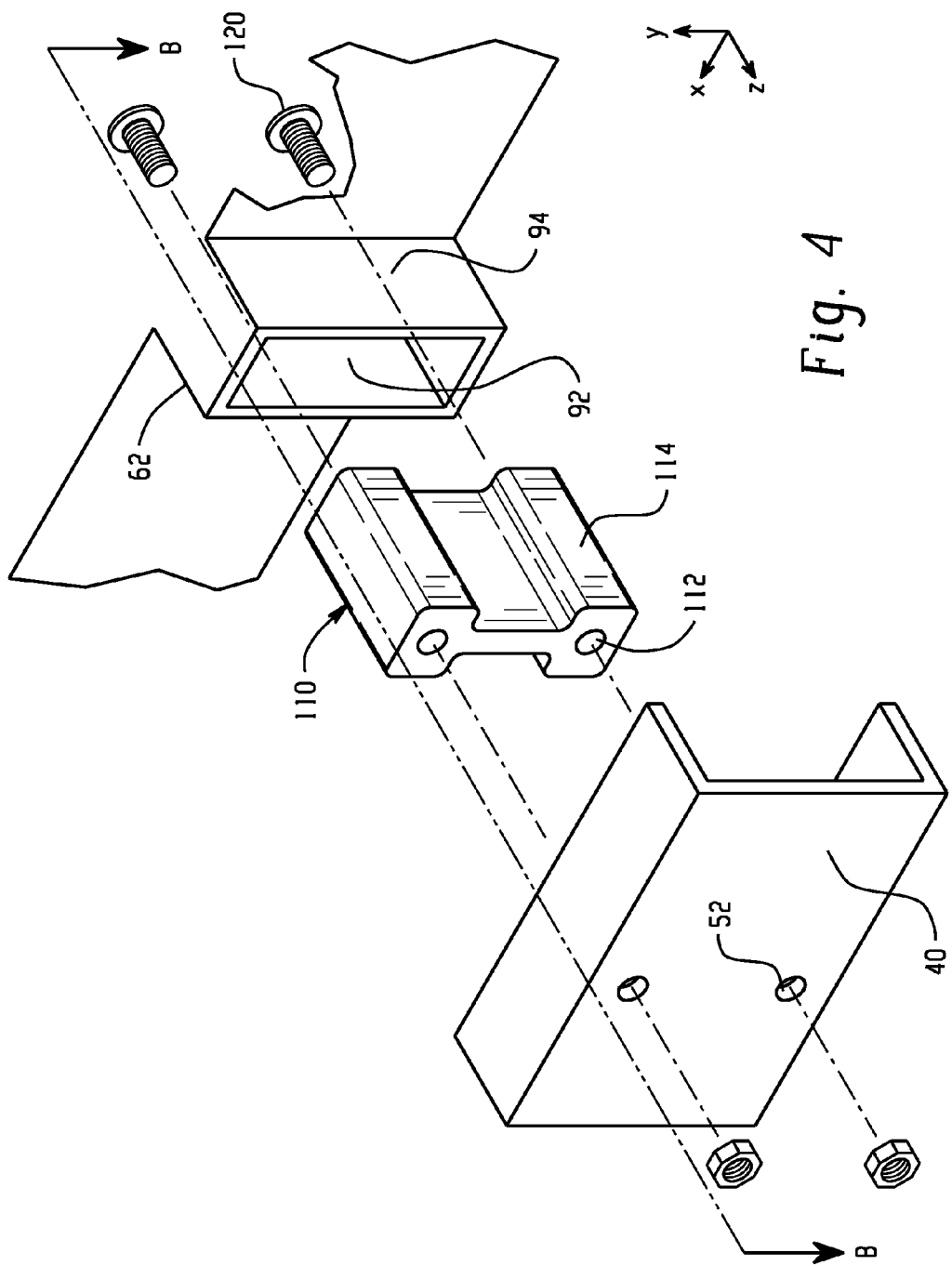
FIG. 4 is an illustration of exploded view of an embodiment of a hybrid beam assembly.

FIG. 4 depicts an exploded view of a hybrid beam 20. A pocket 92 can be formed into the back side 88 of a mating portion 62. A support sleeve 110 can be disposed in the pocket 92. Fasteners 120 can extend through the pocket 92, through holes 112 in a support sleeve 110 and through holes 52 in preform member 40. The support sleeve 110 can have a shape to reduce its weight without compromising its structural integrity, particularly its compressive strength, from a compressive load along the direction of impact. In an embodiment, the support sleeve 110 can have an "I" like shape to reduce its weight without affecting its structural integrity. The cross members of the "I" shape can act as alignment features 114 for aligning holes 112 with holes through the mating portion and or holes 52 through the preform member 40.

Figure 5:
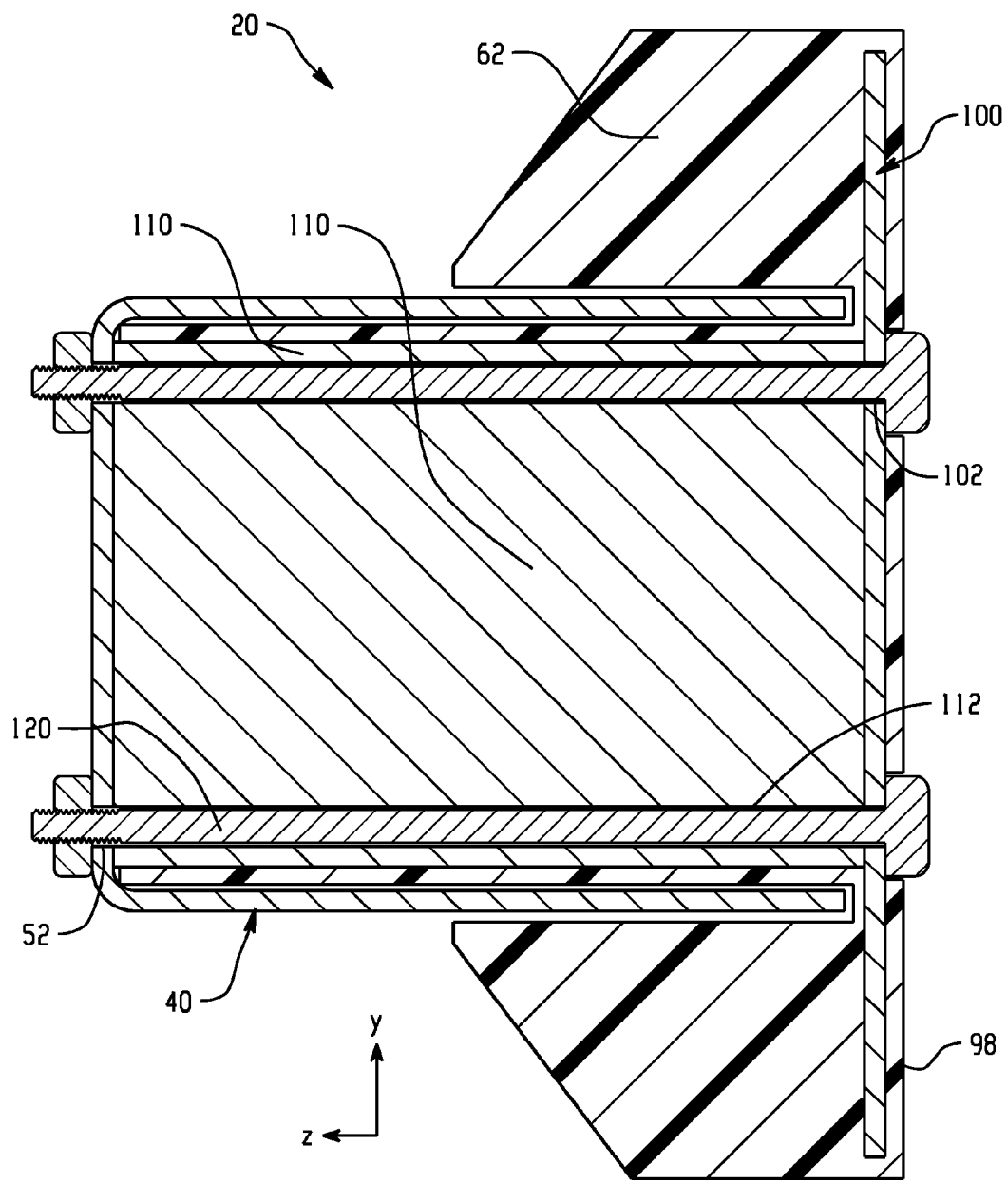
FIG. 5 is an illustration of cross-sectional view of a hybrid beam assembly of FIG. 4 after assembly.

FIG. 5 depicts a cross-sectional view of the hybrid beam 20 of FIG. 4, along the B-B section, in a z-y plane. The reinforcing plate 100 can be integrally formed, as in insert molding, along the front side of the mating portion 62. A section 98 (e.g., thin section) of polymeric material can cover the front side 90 of the reinforcing plate 100. A support sleeve 110 can be disposed in pocket 92 formed into the back side of the mating portion 62. Fasteners 120 can extend through holes 102 in the reinforcing plate 100, through holes 112 in the support sleeve 110, and through holes 52 in the preform member 40. A fastener 120 can be used to secure the hybrid beam 20. Assembling in this fashion can allow for metal-to-metal contact throughout the length of the fastener in embodiments where the reinforcing plate 100, the support sleeve, 110, and the preform member 40 are made of metal.

Figure 6:
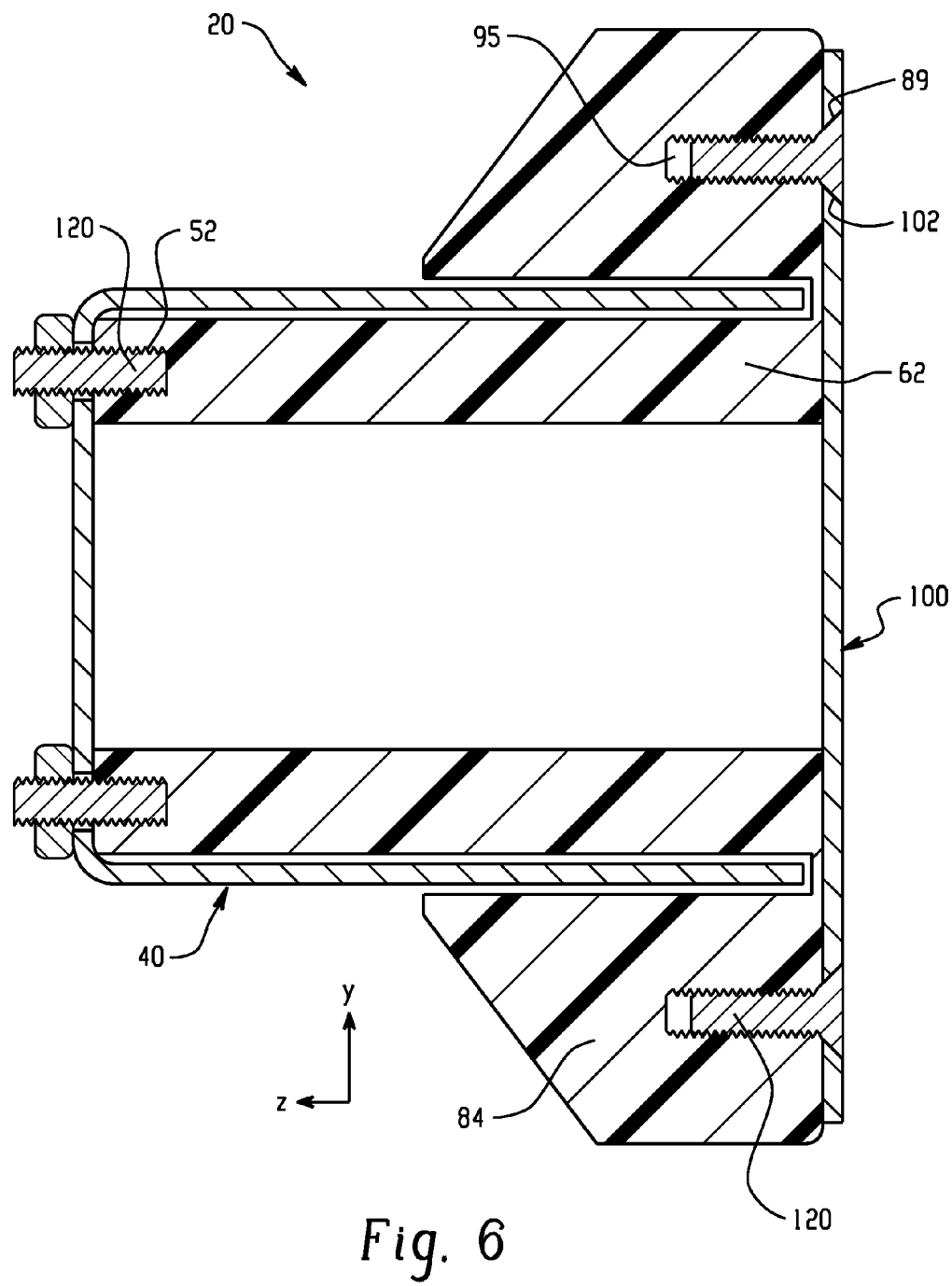
FIG. 6 is an illustration of cross-sectional view of a hybrid beam after assembly.

FIG. 6 depicts a cross-sectional view, taken along a z-y plane, of an embodiment of a hybrid beam 20. A reinforcing plate 100 can be secured to a mating portion 62 with fasteners 120 extending through holes 102 in the reinforcing plate and into cavities 95 in the outer portion 84 of the mating portion 62. The front portion of cavity 95 and hole 102 can have a beveled region 89. A beveled region 89 can allow a fastener 120 to be countersunk, such that it can be flush with the front side 90 of the reinforcing plate 100 when secured. Fasteners 120 can be integrally formed, such as insert molded, with the mating portion 62 of the thermoplastic beam 60. Fasteners 120 can extend through holes 52 in the preform member 40 to secure the thermoplastic beam 60 to the preform member 40.

Figure 7:
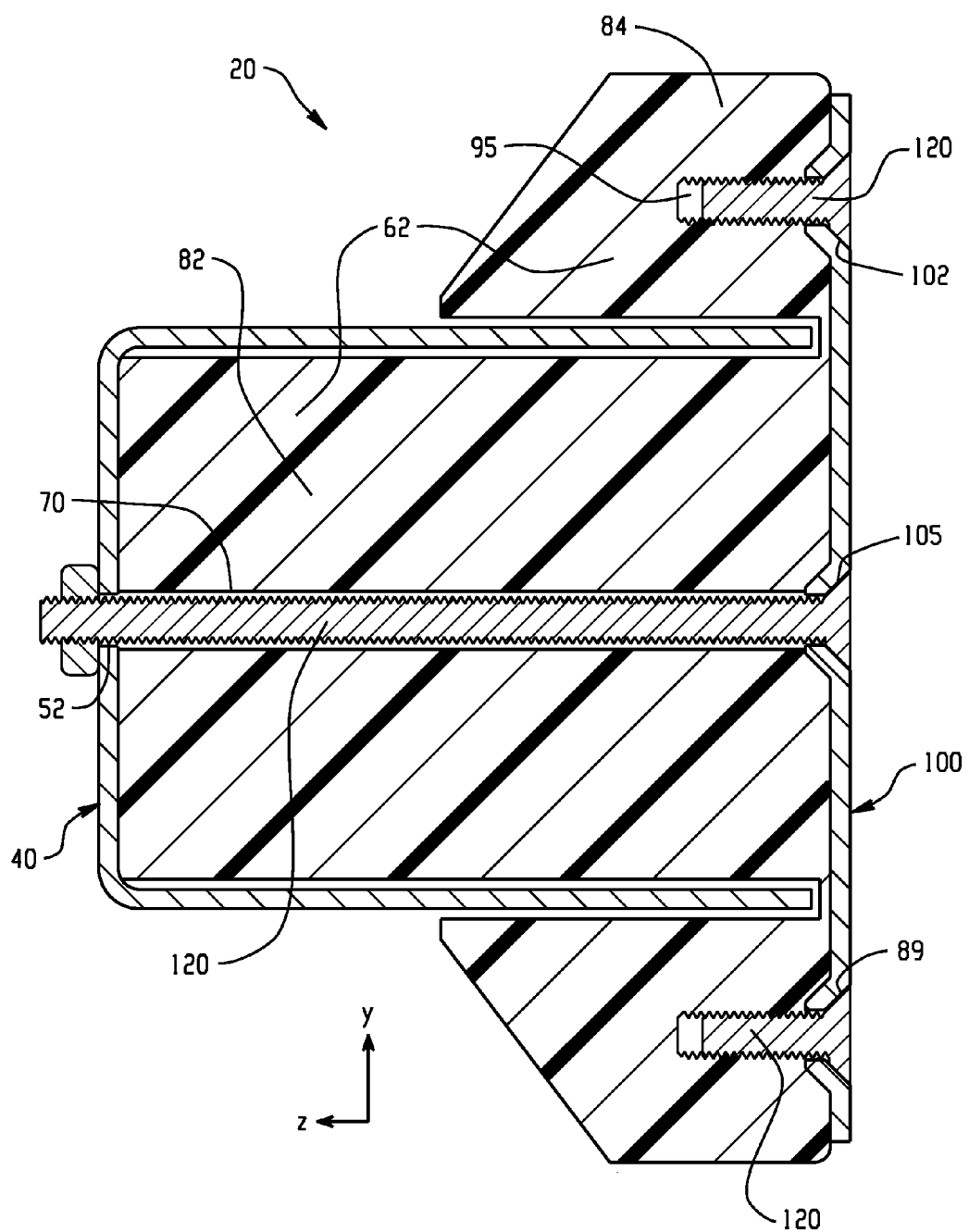
FIG. 7 is an illustration of cross-sectional view of a hybrid beam after assembly.

FIG. 7 depicts a cross-sectional view, taken along a z-y plane, of an embodiment of a hybrid beam 20. A reinforcing plate 100 can be secured to a mating portion 62 with fasteners 120 extending through holes 102 in the reinforcing plate and into cavities 95 in the outer portion 84 of the mating portion 62. A fastener 120 can extend through hole 102 in reinforcing plate 100, through a hole 70 in the central portion 82 of the mating portion 62, and through holes 52 in the preform member 40. Fastener 120 can secure the thermoplastic beam 60 to the preform member 40. The reinforcing plate 100 can have indentations 105 corresponding to beveled region 89 in the mating portion 62 to allow the fasteners 120 to be countersunk and flush mounted to the reinforcing plate 100.

Figure 8:
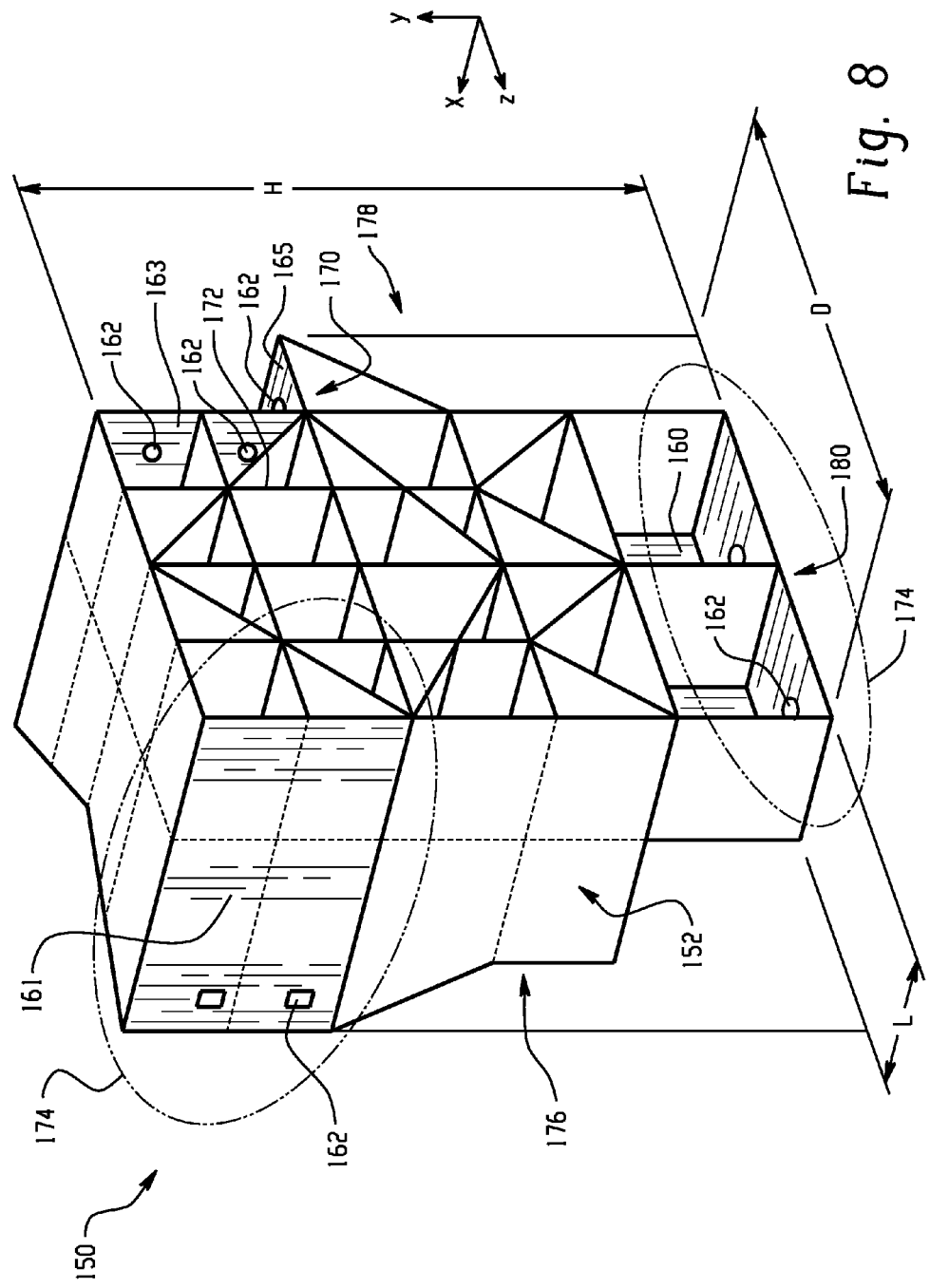
FIG. 8 is an illustration of a hybrid bracket.

FIG. 8 depicts a hybrid bracket 150 made of polymeric portion 152 and reinforcements 160, 161, and 163. A first reinforcement 160 can extend in both a z-y plane throughout a y-x plane of the hybrid bracket. The first reinforcement 160 can extend along a z-x plane along an end 180 of the hybrid bracket. A second reinforcement 161 can extend along a portion of the back side 176 of the hybrid bracket in an x-y plane. A third reinforcement 163 can extend along a portion of the front side 178 of the hybrid bracket in an x-y plane. A forth reinforcement 165 can extend along a surface of a beam support 170. In an embodiment, a polymeric portion 152 having ribs 172 can be molded to reinforcements 160, 161, and 163. The reinforcements 160, 161, 163, and 165 can have holes 162 along attachment regions 174. Holes 162 can be used to mount the hybrid bracket 150 to a vehicle attachment element, to a hybrid beam, and/or to a bracket support element.

Figure 9:
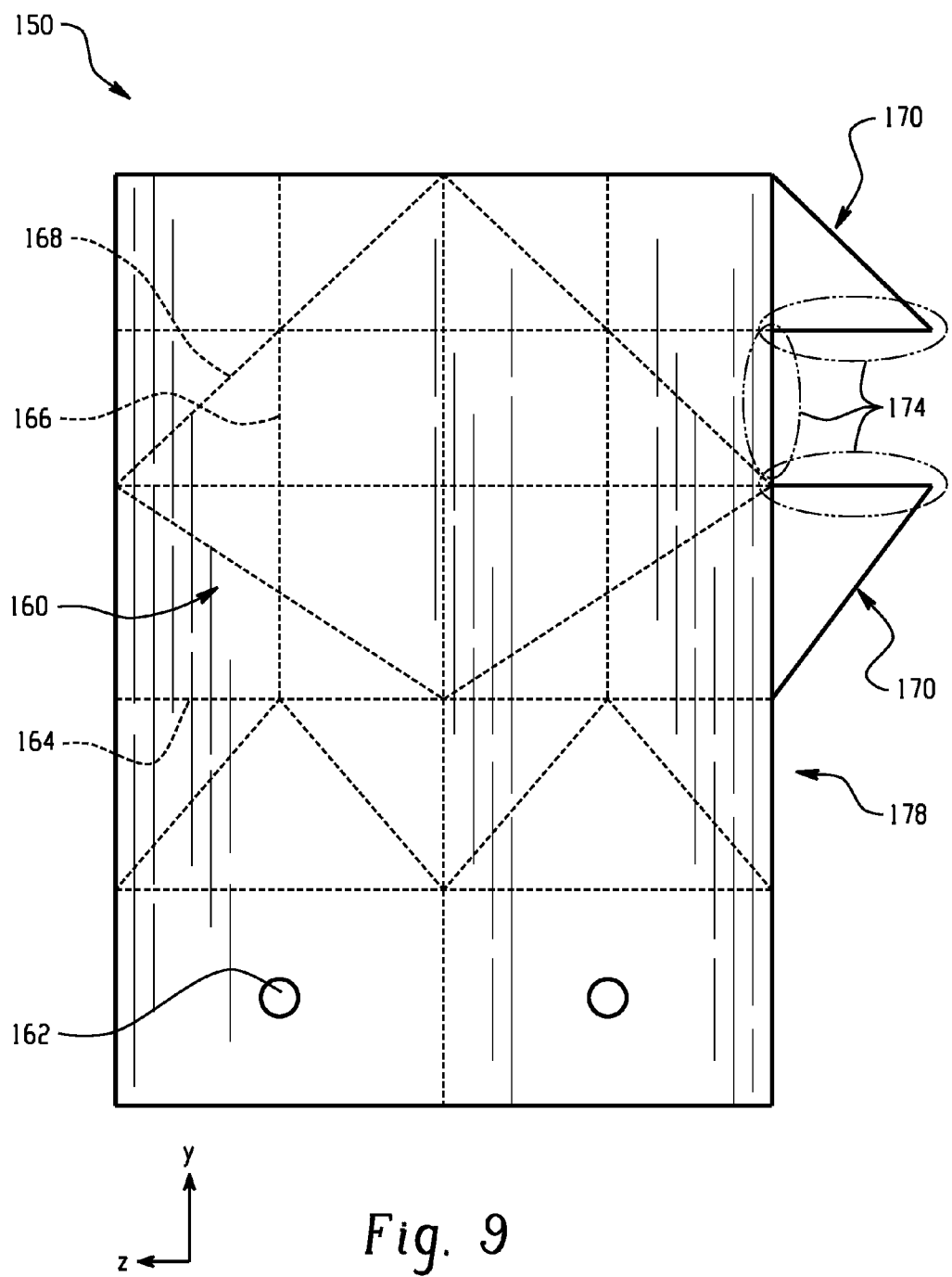
FIG. 9 is an illustration of a side view of the hybrid bracket of FIG. 8.

FIG. 9 depicts a side view of the hybrid bracket 150. A first bracket reinforcement 160 can extend throughout the entire z-y plane, perpendicular to the ribs 164, 166, and 168. A first bracket reinforcement 160 can help to reduce deflection from shear and torsional loads during a vehicle collision. Vertical ribs 166 can extend in the y-axis dimension. Longitudinal ribs 164 can extend in the z-axis dimension. Diagonal ribs 168 can extend between vertical, longitudinal, and/or diagonal ribs (extending along all three axes x, y, and z). Holes 162 can be disposed in bracket reinforcements 160, 161, 163, and 165 for attaching the hybrid bracket 150 to a vehicle attachment element 7. A beam support 170 can protrude from the front side 178 of the hybrid bracket 150 along the z-axis dimension. The beam support 170 can help to hold a hybrid beam 20 in place during assembly. The beam support 170 can add structural support to the hybrid beam 20. A hybrid beam 20 can be attached to a beam support 170 along an attachment region 174. A hybrid beam 20 can be attached to the hybrid bracket 150 along an attachment region 174.

Figure 10:
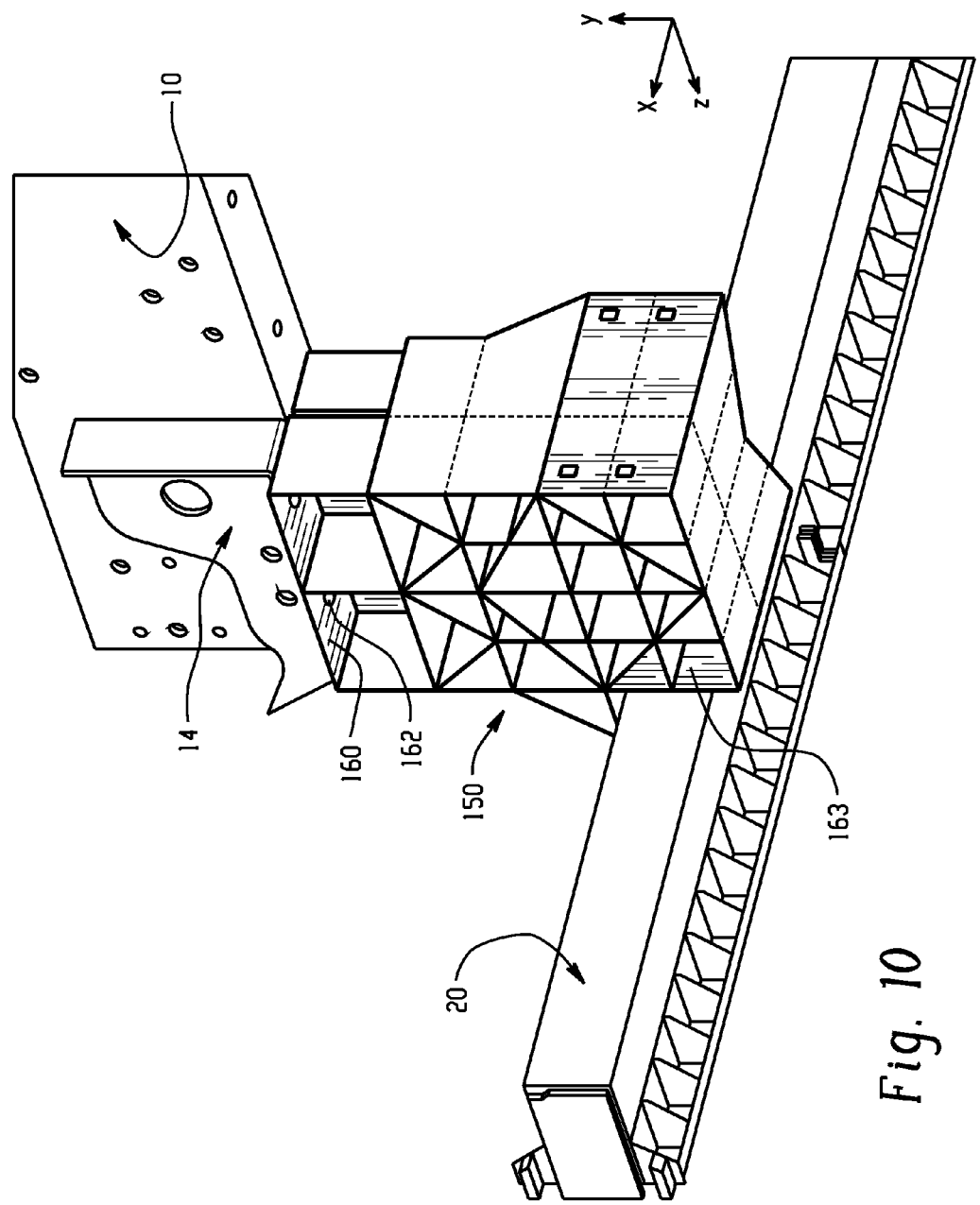
FIG. 10 is an illustration of a hybrid bracket and hybrid beam configured for attachment to a vehicle frame.

FIG. 10 depicts a hybrid bracket 150 mounted to a vehicle frame 10 with the use of an additional metal bracket 14. Holes 162 through a first bracket reinforcement 160 are aligned with holes through the additional metal bracket 14 for securely fastening the hybrid bracket to the vehicle with a fastener. A hybrid beam 20 can be positioned along the front side of the hybrid bracket adjacent to a third bracket reinforcement 163, to which it can be securely attached with a mechanical or chemical attachment. The use of an additional metal bracket 14 in this way can allow for the construction of non-chiral hybrid brackets, that can be positioned on either end of a hybrid beam, without the need for different designs between the left and right hand side hybrid brackets (i.e., chiral designs, e.g., mirror images) of the UPD.

Figure 11:
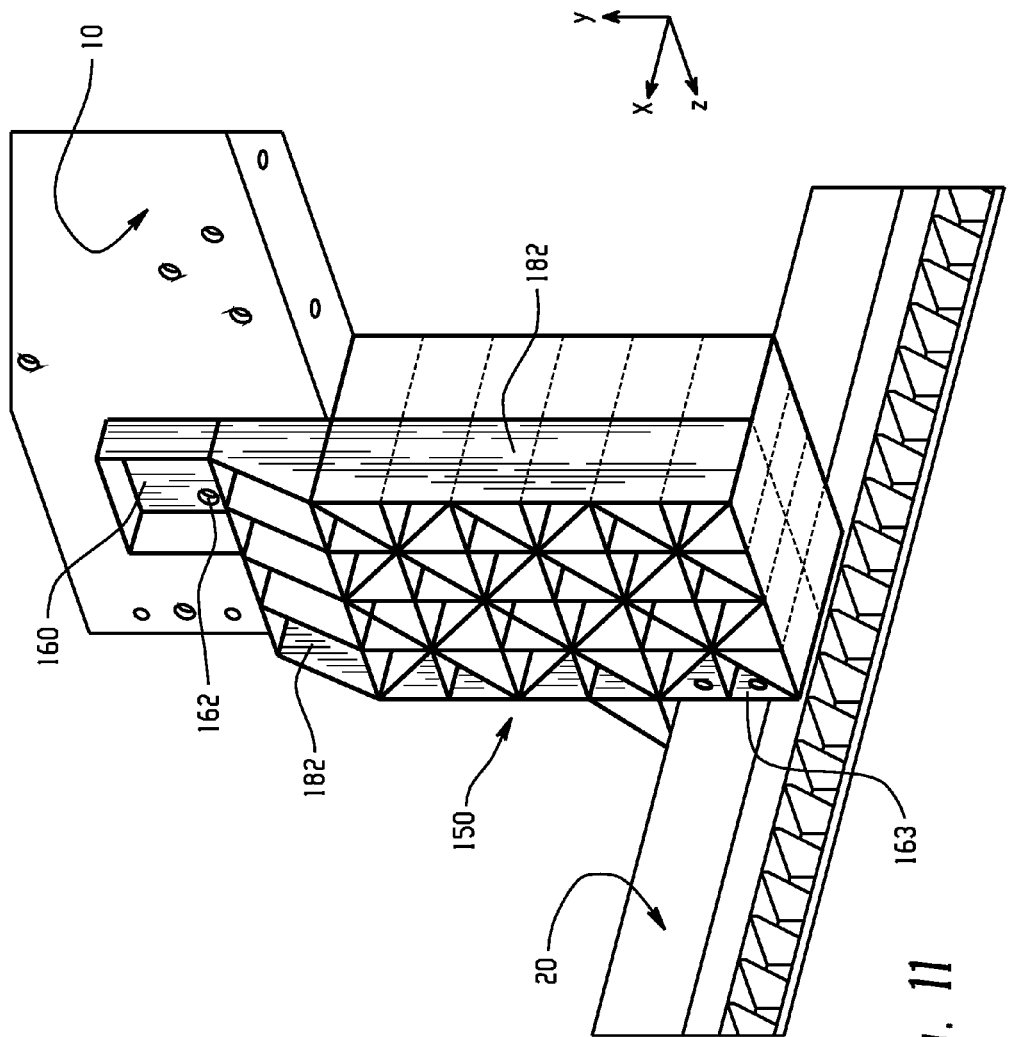
FIG. 11 is an illustration of a hybrid bracket and hybrid beam configured for attachment to a vehicle frame.

FIG. 11 depicts a hybrid bracket 150 mounted to a vehicle frame 10 directly, free of an additional bracket attached to the vehicle frame 10. The first bracket reinforcement 160 can extend through the middle of the hybrid bracket in a z-y plane, and can have two bent ends 182 that extend in an x-y plane along a portion of the front and back sides of the hybrid bracket 150. Holes 162 through the first bracket reinforcement 160 can be aligned with holes through the vehicle frame 10 for securely fastening the hybrid bracket to the vehicle frame 10 with a fastener. A hybrid beam 20 can be positioned along the front side of the hybrid bracket adjacent to a third bracket reinforcement 163, to which it can be securely attached with a fastener. The hybrid bracket 150 of FIG. 11 demonstrates chirality, where a left side bracket can be a mirror image of the right side bracket, and vice versa.

Figure 12:
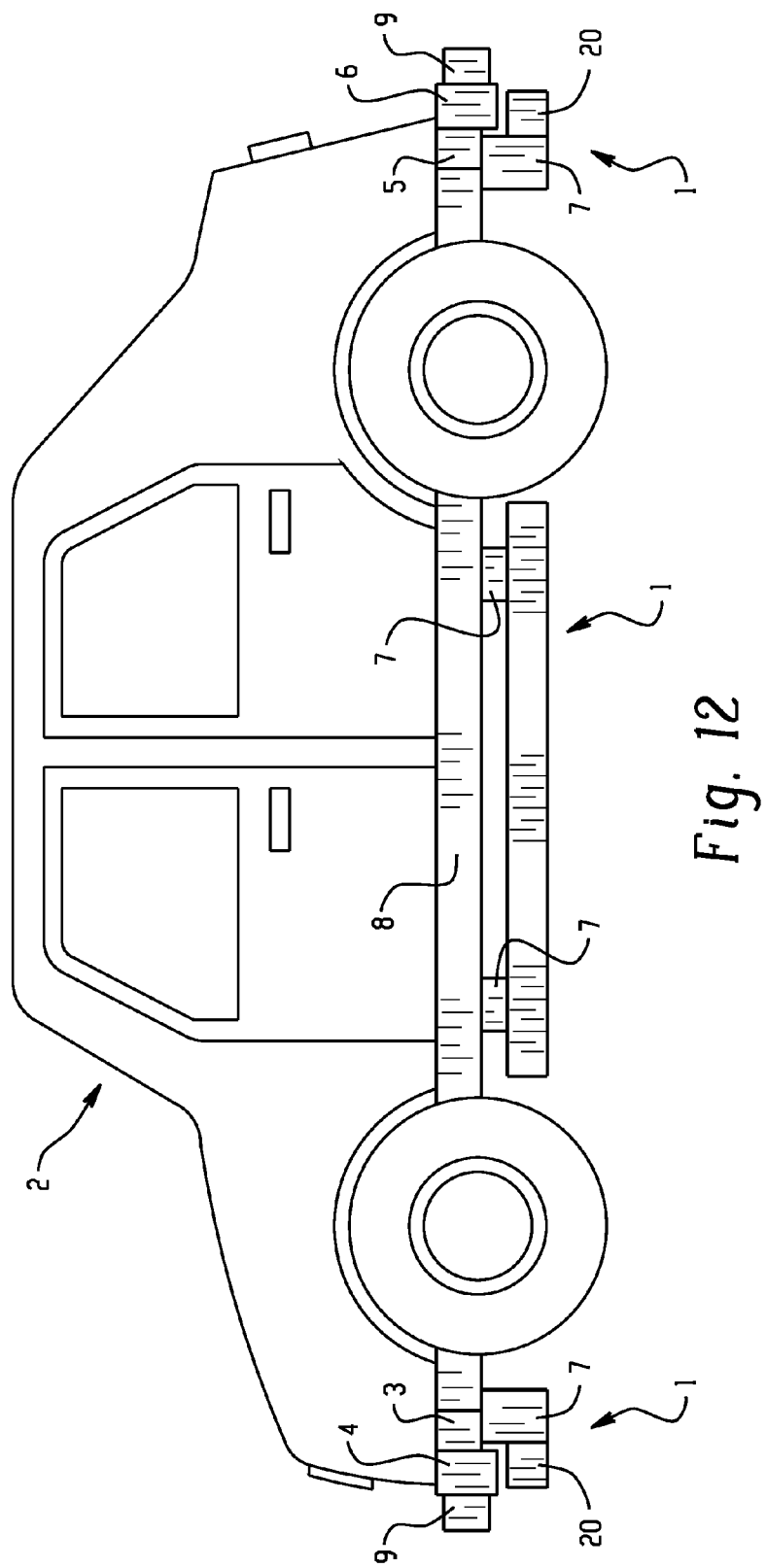
FIG. 12 is an illustration of a vehicle having an UPC in various locations.

FIG. 12 is an illustration of a vehicle 2 having an UPD 1 in various locations. AN UPD 1 can include a hybrid beam 20. AN UPD 1 can be positioned below the front bumper 4 of a vehicle 2. AN UPD 1 can be positioned below the rear bumper 6 of a vehicle 2. AN UPD 1 can be positioned below the side rail 8 of a vehicle 2. AN UPD 1 can be attached the front frame cross member 3, side rail 8, and/or rear frame cross member 5 of a vehicle 2 via vehicle attachment element 7. The front bumper 4, rear bumper 6, and/or side rail 8 can optionally include an energy absorber 9.

The hybrid beam can include a preform member. The preform member can include a material such as metal, polymer, reinforced composite polymer, or a combination comprising at least one of the foregoing. The preform member can include a channel. The channel can have any cross-sectional shape including two side walls, at least one connecting wall, and an open side (i.e., a non-enclosed side). The channel can have a "C", "E", "U", "W", or "V", or similar cross-sectional shape. The channel can have an inside surface and an outside surface. The inside surface of the channel can face away from a vehicle centerline. An opening of the channel can be oriented away from a vehicle centerline. The outside surface of the channel can at least partially face toward a vehicle centerline (e.g. the outside surface of a connecting wall can face a vehicle centerline). At least a portion of the inside surface of a channel can face the open side (e.g. the inside surface of the connecting wall can face the open side of a channel). The channel can be open on both ends (e.g. open in a plane orthogonal to the length dimension).

The hybrid beam can include a thermoplastic beam. A thermoplastic beam can include a material such as metal, polymer (including foamed polymers, such as high density polymer foam), reinforced composite polymer, or a combination comprising at least one of the foregoing. A portion of the thermoplastic beam can be disposed within the channel of the preform member. A thermoplastic beam can be shaped to conform to the inside surface of the channel of the preform member. The thermoplastic beam can at least partially abut the inside surface of the channel of the preform member. The thermoplastic beam can abut a portion of the inside surface of the channel of the preform member. A thermoplastic beam can be molded to the preform member, such as in an insert molding or over-molding process. A thermoplastic beam can be co-molded with a preform member. A thermoplastic beam can be joined to the preform member with a friction fit. The thermoplastic beam can be friction fit into the channel without mechanical or chemical attachments (e.g. glue, adhesive, mechanical means, and so forth). In an embodiment, a thermoplastic beam having a polymeric material can be overmolded over the preform member. The preform member can include grooves with openings in the grooves such that a polymeric material of a thermoplastic beam can pass through the opening and spread within the groove, thereby locking the preform member and thermoplastic beam together. The thermoplastic beam can be co-molded with the preform member and portions of the thermoplastic beam located within the channel. This can be achieved by insert molding or like processes.

In addition, certain attachments may be employed to affix the thermoplastic beam to the preform member. The attachments can be mechanical. Examples of mechanical attachments include locking element(s) (such as polymer (e.g., polymer extruded through an opening in a channel wall connecting the thermoplastic beam to a surface of the preform member)), fasteners (such as snaps, hooks, screws, bolts, rivets) welds, crimp(s) (e.g., a crimped metallic wall), protrusions from the preform member wall to and/or into the thermoplastic beam (such as tabs or the like extending from the wall(s) into the channel to engage the thermoplastic beam), protrusions from the thermoplastic beam to and/or into the preform member, and the like. Mechanical attachments can include insert molding, overmolding, or co-molding of two elements together. The attachments can be chemical. Examples of chemical attachments include bonding agents, glue, adhesive, and so forth.

A thermoplastic beam can have a length of 100 mm to 3,000 mm, for example, 200 mm to 1,000 mm, or, 600 mm to 700 mm. A beam insert module can have a height of 75 mm to 1,000 mm, for example, 80 mm to 300 mm, or, 100 mm to 120 mm. A beam insert module can have a depth of 25 mm to 300 mm, for example, 50 mm to 200 mm, or, 80 mm to 200 mm.

A thermoplastic beam can provide additional structural integrity to the hybrid beam while maintaining a low weight in comparison to a steel beam. The preform member can include an opening, extending in a thickness dimension, forming a hole. In an embodiment, a fastener for joining the preform member to the thermoplastic beam and/or a frame attachment element can be used to pass through or engage a hole in the preform member. A hole can have any size and shape, and can correspond to the size, shape, and/or type of mechanical attachment used. A hole can be threaded, for receiving a threaded fastener, or can be non-threaded.

The thermoplastic beam can include a mating portion. A mating portion can include a material such as metal, polymer, reinforced composite polymer, or a combination comprising at least one of the foregoing. Optionally, the thermoplastic beam can include a reinforcing plate. Optionally, the thermoplastic beam can include a support sleeve. The thermoplastic beam, mating portion, reinforcing plate, and support sleeve can each have a back side and a front side, where the front side faces the direction of impact. The cross-sectional shape of the back side of the mating portion can complement the shape of the preform member. The back side of the mating portion can include a channel, or elongated groove, extending in at least the depth and length dimensions. A channel can have a shape which conforms to a side wall of the preform member. The cross-sectional shape of the mating portion can conform to at least one of the shape of the inside surface of the channel of the preform member and the shape of the outside surface of the channel of the preform member. The central portion of the mating portion can be fixed within the channel of the preform member. The central portion can abut the channel of the preform member. The outer portion, or peripheral portion, of the mating portion can extend in the depth and length dimensions along a portion of the outside surface of the preform member. The cross-sectional shape of the outer portion of the mating portion taken in the depth and height dimensions can extend along the length of the thermoplastic beam. In an embodiment, a mating portion can be in conformal relationship with a preform member.

The preform member and the thermoplastic beam can include corresponding features for snap-fitting the two together. Features for snap-fitting can include a protruding lip, a flange, a recess, a groove and the like, such that the features can interlock and resist separation along at least the depth dimension of the hybrid beam. For example, the preform member can have a flange, or protrusion, extending in the height dimension from a side wall and extending at least a portion of the length of the preform member. A groove having a shape and height corresponding to the flange shape and height can be formed into a channel of the mating portion. A side wall of the preform member can be inserted into a channel of the mating portion of the thermoplastic beam. A flange extending from the preform member can fit into a corresponding groove in the channel and can resist separation (along the depth dimension) of the preform member and the thermoplastic beam.

The thermoplastic beam can optionally include a reinforcing plate. A reinforcing plate can include a material such as metal, polymer, reinforced composite polymer, or a combination comprising at least one of the foregoing. A reinforcing plate can be disposed along the front side of the thermoplastic beam. A reinforcing plate can be coupled to a front side of a thermoplastic beam. A reinforcing plate can be friction fit to a thermoplastic beam. A reinforcing plate can be coupled to a front side of a mating portion. A reinforcing plate can be disposed along a front side of a mating portion. A reinforcing plate can be mechanically attached to a mating portion. A reinforcing plate can be chemically attached to a mating portion. In an embodiment, a reinforcing plate can be molded within the mating portion. A thin section of the mating portion can be disposed along the front side of a reinforcing plate molded within a mating portion, such a section can be less than 5 millimeters (mm) thick in the depth dimension, for example, 1 mm to 5 mm, or, 2 mm to 4 mm thick.

A reinforcing plate can extend past a side wall of a preform member. For example, a reinforcing plate can extend in a y-axis dimension in the attached figures past a side wall of a channel of a preform member. A reinforcing plate can have any cross-sectional shape along its length dimension. A reinforcing plate can have a cross-sectional shape that varies along its length dimension. An outer portion of a mating portion can assist in providing structural support to a reinforcing plate. The outer portion can resist bending of the reinforcing plate along the height dimension in the case of an impact. For example, an outer portion of a mating portion can be configured to stiffen the reinforcing plate and keep it from bending over the side wall of a channel of the preform member.

A reinforcing plate can have a length of 100 mm to 3,000 mm, for example, 200 mm to 1,000 mm, or, 600 mm to 700 mm. A reinforcing plate can have a height of 75 mm to 1,000 mm, for example, 80 mm to 300 mm, or, 100 mm to 120 mm.

A reinforcing plate can have a thickness of 0.5 mm to 10 mm, for example, 0.5 mm to 5 mm, or, 1 mm to 3 mm.

The thermoplastic beam can optionally include a pocket. A pocket can extend any distance along the depth dimension. A pocket can extend the entire depth through the thermoplastic beam to form a hole. A separate reinforcing plate can be disposed along the front side of the mating portion adjacent a hole through the mating portion to create a pocket. Alternatively, an opening can extend from the back side of the mating portion (or thermoplastic beam) to the back side of a reinforcing plate integral with the mating portion. A pocket formed into the thermoplastic beam can be positioned adjacent to a hole through the reinforcing plate and/or adjacent to a hole through the mating portion.

A pocket in the mating portion of the thermoplastic beam can have a length of 10 mm to 100 mm, for example, 10 mm to 50 mm, or, 15 mm to 25 mm. A pocket in the mating portion of the thermoplastic beam can have a height of 10 mm to 800 mm, for example, 20 mm to 100 mm, or, 40 mm to 70 mm. A pocket in the mating portion of the thermoplastic beam can have a depth of 25 mm to 300 mm, for example, 50 mm to 200 mm, or, 80 mm to 200 mm.

A thermoplastic beam can optionally include a support sleeve. A support sleeve can include a material such as metal, polymer, reinforced composite polymer, or a combination comprising at least one of the foregoing. A support sleeve can be mechanically attached to a mating portion. A support sleeve can be chemically attached to the mating portion. A support sleeve can be disposed within a pocket in the mating portion. The mating portion, the reinforcing plate, and the support sleeve can each include an opening, forming a hole and/or a cavity. A hole and/or cavity can allow for a mechanical attachment to join the elements. A support sleeve can be sized to fit within a pocket of the mating portion. A central portion of the mating portion of the thermoplastic beam, and an optional support sleeve, can be confined in the channel of the preform member, sandwiched between the reinforcing plate and the preform member. In an embodiment, a support sleeve can be molded within a mating portion. A support sleeve can extend from the back side of the mating portion (corresponding to the back side of the thermoplastic beam) to the front side of the mating portion, such that the front and back face of the sleeve are flush with the front side and back side of the mating portion respectively. A support sleeve can extend from the back side of the mating portion to the back side of a reinforcing plate joined to the mating portion.

The support sleeve can resist deformation of the reinforcing plate due to a compressive load when joining a thermoplastic beam to a preform member using a mechanical attachment, for example, a fastener. The support sleeve can provide metal-to-metal engagement of the fastener throughout the depth dimension of the hybrid beam.

A support sleeve can have a length of 10 mm to 100 mm, for example, 10 mm to 50 mm, or, 15 mm to 25 mm. A support sleeve can have a height of 10 mm to 800 mm, for example, 20 mm to 100 mm, or, 40 mm to 70 mm. A support sleeve can have a depth of 25 mm to 300 mm, for example, 50 mm to 200 mm, or, 80 mm to 200 mm.

An alignment element, such as a protrusion and/or recess can be formed in the pocket of the mating portion. An alignment element, such as a protrusion and/or recess can be formed on the support sleeve for aligning holes through the support sleeve with holes through the mating portion and/or reinforcing plate. A reinforcing plate can have curved sides and/or ends, corresponding to a curvature along the surface of the front side of the mating portion. Curved sides or ends of the reinforcing plate can aid in aligning holes through the reinforcing plate with holes and/or cavities in the mating portion. Alignment aids and elements can ensure alignment of holes and/or cavities throughout the depth dimension. Assembly time of the hybrid beam can be reduced by utilizing alignment aides. Ease of assembly of the hybrid beam can be improved through the use alignment elements.

The elements of the hybrid beam including a preform member, a thermoplastic beam, a mating portion, an optional reinforcing plate, and an optional support sleeve can be joined together by a mechanical attachment and/or by a chemical attachment (as discussed in the foregoing).

When integral with the mating portion (e.g., when over molded, insert molded or comolded), areas of the reinforcing plate can be exposed (e.g., not covered in polymer). Portions of a reinforcing plate, along the perimeter of a hole through the reinforcing plate, can be exposed, i.e., free of plastic, on one or both sides of the reinforcing plate. A fastener can abut the reinforcing plate. In an embodiment, a metal fastener can be in metal-to-metal contact with a metal reinforcing plate and a metal preform member. For example, a bolt head can contact the front side a metal reinforcing plate and a corresponding nut can contact the outside surface of a metal preform member.

The mating portion of the thermoplastic beam can include ribs extending from the front side in the depth dimension. Ribs can define interstices in the mating portion. Ribs can define walls of cavities, or pockets, opening toward the back side of the mating portion. Ribs can enhance the structural characteristics (e.g., torsional rigidity, shear strength, compressive strength, tensile strength, and the like) of the thermoplastic beam and hybrid beam, particularly in response to a force applied in the direction of impact. Ribs can be disposed within the central portion of the mating portion (corresponding to the central portion of the thermoplastic beam). Ribs can be disposed within the outer portion of the mating portion (corresponding to the outer portion of the thermoplastic beam). Ribs can extend in any direction, and can have any orientation, size, thickness, and shape.

A longitudinal rib can extend in a plane parallel to a plane defined by the length and depth dimensions. A vertical rib can extend in a plane parallel to a plane defined by the depth and height dimensions. A diagonal rib can extend in a plane parallel to a plane defined by a plane extending in the depth dimension and intersecting one of the foregoing planes at a non-right angle. In other words, a diagonal rib can extend in a plane which can intersect both the plane of a longitudinal and the plane of a vertical rib.

A rib can have any cross-sectional thickness (or thickness) measured in a dimension perpendicular to the plane in which the rib extends. A diagonal, longitudinal, and/or vertical rib can each have a different thickness. The thickness of a rib can be from 1 millimeter (mm) to 10 mm, for example 1 mm to 5 mm, or, 1 mm to 3 mm. The thermoplastic beam can include any number of ribs of a given orientation (e.g. longitudinal, vertical, or diagonal). Ribs of a given orientation can be disposed parallel (i.e., in non-intersecting planes) and adjacent to one another. Parallel ribs can be spaced with any desirable distance between them, for example, the ribs can be 10 millimeter (mm) to 100 mm apart as measured in a direction perpendicular to the adjacent parallel ribs, or, 20 mm to 75 mm apart, or 25 mm to 50 mm apart. Ribs can intersect one another. The rib spacing can be varied based on the size and desired structural characteristics of the UPD. The rib thickness can be varied based on the size and desired structural characteristics of the UPD.

The support sleeves can be inserted into the pockets formed by ribs or separately formed pockets. The pocket for holding a support sleeve can be formed in a location that disrupts, or interrupts, the rib pattern in the area of the pocket. In other words, walls disposed along the perimeter of an opening, and along the depth of an opening can be formed by ribs, or can intersect ribs. When pocket walls intersect ribs the rib pattern can be interrupted in a discrete portion of the mating portion of the thermoplastic beam, localized around a pocket or hole. Pockets disposed in this way can result in discontinuities in the rib pattern along the opening of the pocket. Pockets, or holes, can be formed anywhere along the back side of the mating portion and can have any size.

The thermoplastic beam can include multiple sections. A thermoplastic beam section can include a reinforcing plate section. A thermoplastic beam section can include a mating portion section. A thermoplastic beam section can include a support sleeve. Sections of a thermoplastic beam can be assembled together in an end-to-end fashion to extend the length of a hybrid beam. Individual thermoplastic beams can have a length ($L_i$), measured in the x-axis dimension of the attached figures. The length $L_i$ can be less than the total length, L, of the hybrid beam. A mating portion of a thermoplastic beam section can have a length equal to the length of the thermoplastic beam section. The thermoplastic beam sections can have attachment features for joining adjacent sections together. The attachment features can be disposed at an end portion. The attachment features can include mechanical joints. The attachment features can be shaped complimentary to one another, as in forming overlapping joints, e.g., lap joints or splice joints, interlocking joints, and/or butt joints. The attachment features can be interlocking joints. Interlocking joints can be removably interlocking, such that adjacent sections mate to one another and resist separation along at least one axis. Interlocking joints can mate to one another and resist separation along at least two orthogonal axes. Interlocking attachment features can include engagements that snap together, slide together, pivot together, or twist together; such features can include dove-tail, tongue and groove, tongue and fork, features described as protrusion and recess, and the like, or a combination comprising at least one of the foregoing. Thermoplastic beam sections can be coupled together with a strap spanning a joint and coupled to each beam section. Adjacent thermoplastic beam sections can be attached together using mechanical attachments. Adjacent thermoplastic beam sections can be attached together using chemical attachments.

A thermoplastic beam section can have a length ($L_i$) of 100 mm to 3,000 mm, for example, 200 mm to 1,000 mm, or, 600 mm to 700 mm. A thermoplastic beam section can have a height of 75 mm to 1,000 mm, for example, 80 mm to 300 mm, or, 100 mm to 120 mm. A thermoplastic beam section can have a depth of 25 mm to 300 mm, for example, 50 mm to 200 mm, or, 80 mm to 200 mm.

A reinforcing plate can be mechanically and/or chemically attached to the front side of more than one mating portion sections which are joined together in an end-to-end fashion as previously described. A reinforcing plate can be mechanically and/or chemically attached to two or more mating portions which are separated along the x-axis dimension. In an embodiment, a mechanical attachment can affix two or more mating portion sections along a reinforcing plate such that there are spaces in the length direction between each mating portion. Foam material, e.g., high density foam, can be used to fill spaces between mating portion sections, between a reinforcing plate and a preform member.

A hybrid beam can be attached to a vehicle attachment element with a mechanical attachment, as previously described herein. A hybrid beam can be attached to a vehicle attachment element with a chemical attachment, as previously described herein. A hybrid beam can be positioned below the frame of a vehicle with the open side of the channel of the preform member facing toward the direction of impact. When positioned in this way the channel shape and thermoplastic beam ribs can provide structural integrity to the hybrid beam, at least providing stiffness to the hybrid beam, such that it resists bending in the direction of impact. In an embodiment, the preform member of the hybrid beam can be welded to a vehicle attachment element. A thermoplastic beam section, or a full length thermoplastic beam, can be attached the preform member after a welding operation is complete to avoid heat distortion of the mating portion.

A hybrid beam can be positioned at a distance of 10 mm to 500 mm below the frame of a vehicle. A hybrid beam can be positioned at a distance of 50 mm to 500 mm above the ground, i.e., above a flat level plane extending through parts of the vehicle designed to touch the ground (e.g., tires, tracks, skis, and the like).

A hybrid beam can be positioned below the frame of a vehicle. A hybrid beam can be configured to couple with the vehicle at least partially below an underbody of the vehicle, to at least partially occlude a passage to a space under the underbody from outside of the vehicle. A hybrid beam can extend along a side of a vehicle parallel with a vehicle centerline. A vehicle centerline can bisect a vehicle along a vehicle's length dimension. A vehicle centerline can bisect a vehicle along a vehicle's width dimension. A hybrid beam can be positioned below a front bumper of a vehicle. A hybrid beam can be positioned below a rear bumper of a vehicle. A hybrid beam can be positioned below a side rail of a vehicle. A hybrid beam can be disposed in mechanical communication with a vehicle frame. A hybrid beam can be directly attached to a vehicle frame, in which the hybrid beam abuts another structural member. A hybrid beam can be indirectly attached to a vehicle frame, such as attached to a vehicle frame via a vehicle attachment element, e.g., where an intermediary component sandwiched between the hybrid beam and a structural member, abutting each.

A hybrid bracket can include a polymeric portion. A polymeric portion can include a material such as a polymer, reinforced composite polymer, or a combination comprising at least one of the foregoing. A polymeric portion can include structural features, such as ribs. Ribs of the hybrid bracket can extend in any direction, and have any orientation, size, and shape. A longitudinal rib can extend in a plane parallel to a plane defined by the length and depth dimensions of the hybrid bracket. A vertical rib can extend in a plane parallel to a plane defined by the length and height dimensions of the hybrid bracket. A diagonal rib can extend in a plane parallel to a plane defined by a plane extending in the length dimension of the hybrid bracket, and intersecting one of the foregoing planes at a non-right angle. In other words, a diagonal rib can extend in a plane which can intersect both the plane of a longitudinal and the plane of a vertical rib. Ribs of this kind can enhance the structural integrity of the hybrid bracket, at least in part by helping to prevent torsion of the hybrid bracket during a collision.

A hybrid bracket can include a reinforcement. A reinforcement can include a material such as metal, polymer, reinforced composite polymer, or a combination comprising at least one of the foregoing. A reinforcement can be strategically located and oriented to enhance the structural characteristics of the hybrid bracket, for example, stiffness, shear strength, torsional rigidity, and the like. A reinforcement of the hybrid bracket can be located at an attachment region. An attachment region can be located anywhere on a hybrid bracket. An attachment region can be located where a hybrid beam can attach to the hybrid bracket. An attachment region can be located where a hybrid bracket can attach to a vehicle attachment element. An attachment region can be located where a bracket support element can attach to a hybrid bracket. In an embodiment, a reinforcement can provide a metal-to-metal contact point when a hybrid bracket is attached to a vehicle attachment region and/or when a hybrid bracket is attached to a hybrid beam.

A reinforcement of the hybrid bracket can have an opening extending in a thickness dimension of the reinforcement to form a hole. A hole can allow a mechanical attachment (e.g., a fastener) to extend through the bracket. A reinforcement of the hybrid bracket can be attached to the polymeric portion with a mechanical attachment. A reinforcement of the hybrid bracket can be attached to the polymeric portion with a chemical attachment. In an embodiment, a polymeric portion of a hybrid bracket can be molded onto a reinforcement. In an embodiment, a reinforcement can be metal and can provide a metal-to-metal connection with a vehicle attachment element and/or with a metal part of a hybrid bracket. A metal-to-metal connection can improve shear strength at the connection. A metal-to-metal connection can allow for higher torque of torqued fasteners (bolts, screws, and the like). The use of a metal-to-metal connection can eliminate viscoelastic creep of a polymeric material (e.g., polymeric material adjacent to a fastener) at an attachment point.

The length and height dimensions of a reinforcement of a hybrid bracket can depend on the length and height dimensions of the hybrid bracket. The length and height dimensions of a reinforcement of a hybrid bracket can depend upon the desired structural characteristics of the hybrid bracket. A bracket reinforcement can have a thickness (measured along the shortest dimension of the bracket reinforcement) of 1 mm to 10 mm, for example, a thickness of 1 mm to 5 mm, or, 1 mm to 3 mm. A hybrid bracket can include a beam support protruding from the bracket. A beam support can include a material such as metal, polymer, reinforced composite polymer, or a combination comprising at least one of the foregoing. A beam support can be any shape or size. A beam support can hold a hybrid beam in position during an assembly operation. A beam support can include two protrusions forming a shape corresponding to the shape of the hybrid beam. A beam support can include a first protrusion adjacent to a first surface of a hybrid beam and a second protrusion adjacent a second surface of a hybrid beam. A beam support can include structural ribs. Ribs of a beam support can extend in any direction. Ribs of a beam support can have any shape. A beam support can be attached to a hybrid beam with a mechanical attachment. A beam support can be attached to a hybrid beam with a chemical attachment. A beam support can include ribs. A beam support can provide structural integrity to the UPD.

A hybrid bracket can be configured to attach to a vehicle attachment element along one or more surfaces of the bracket. A hybrid bracket can be attached to a vehicle attachment element with a mechanical attachment. A hybrid bracket can be attached to a vehicle attachment element with a chemical attachment. A hybrid bracket can be attached to a hybrid beam with a mechanical attachment. A hybrid bracket can be attached to a hybrid beam with a chemical attachment. A hybrid bracket can be attached to a beam with a mechanical attachment. A hybrid bracket can be attached to a beam with a chemical attachment.

The hybrid beam can be reinforced along sections of the beam by a beam reinforcement. A beam reinforcement can be made of metal, polymer, reinforced composite polymer, or a combination comprising at least one of the foregoing. A beam reinforcement can have a corrugated shape along one dimension. A beam reinforcement can have multiple walls extending along a depth dimension (in the z-axis dimension of the attached figures). A beam reinforcement can include opposing walls and ribs extending between the opposing walls. A beam reinforcement can be disposed along a back side of the preform member to provide additional structural integrity to a hybrid beam. A beam reinforcement can provide additional stiffness to a hybrid beam. A beam reinforcement can help to reduce deflection of a hybrid beam in the direction of impact during a collision. A beam reinforcement can help to reduce deformation (e.g., channel spreading) of a hybrid beam due to bending.

A beam reinforcement can be located between a hybrid beam and a vehicle frame. A beam reinforcement can be adjacent a frame attachment element. A beam reinforcement can be sandwiched between a frame attachment element and a hybrid beam. A beam reinforcement can be disposed in mechanical communication with the outside surface of the preform member of the hybrid beam. A beam reinforcement can be disposed along a portion of the outside surface of the back side of the preform member. A beam reinforcement can have a channel shape complementing the shape of a preform member of a hybrid beam. A beam reinforcement can be solid. A beam reinforcement can include a hollow section. A beam reinforcement can be attached to a hybrid beam with a mechanical attachment. A beam reinforcement can be attached to a hybrid beam with a chemical attachment. A beam reinforcement can be attached to a vehicle attachment element with a mechanical attachment. A beam reinforcement can be attached to a vehicle attachment element with a chemical attachment.

A beam reinforcement can have a thickness of 1 mm to 20 mm, for example, 2 mm to 5 mm, or, 2 mm to 3 mm. A beam reinforcement can have a length of 100 mm to 1,000 mm, for example, 200 mm to 600 mm, or, 350 mm to 450 mm. A beam reinforcement can have a height of 10 mm to 1,000 mm, for example, 25 mm to 200 mm, or, 50 mm to 100 mm. A beam reinforcement can have a depth of 10 mm to 200 mm, for example, 25 mm to 100 mm, or, 25 mm to 75 mm.

A bracket support element can be used to add structural integrity to a hybrid bracket attached to a vehicle attachment element. A bracket support element can be made of metal, polymer, reinforced composite polymer, or a combination comprising at least one of the foregoing. A bracket support element can be extended between two or more hybrid brackets. A bracket support element can extend between a hybrid bracket and a vehicle attachment element. A bracket support element can be attached a hybrid bracket at an attachment region of the hybrid bracket. A bracket support element can attach to a hybrid bracket with a mechanical attachment. A bracket support element can attach to a hybrid bracket with a chemical attachment. A bracket support element can attach to a vehicle attachment element with a mechanical attachment. A bracket support element can attach to a vehicle attachment element with a chemical attachment. A bracket support element can include a longitudinal beam, or brace. A bracket support element can extend from a hybrid bracket attachment region to the vehicle attachment element, like a truss. A bracket support element can provide additional structural support to the hybrid bracket. A bracket support element can help to distribute impact energy across the entire length of an UPD. A bracket support element can help to balance the impact energy across a larger portion of a vehicle frame. A bracket support element can provide structural support to an UPD. In an embodiment, a support bracket element can transfer a portion of the impact energy associated with a collision from a hybrid bracket to another and/or from one side of the vehicle frame to the other. A bracket support element can support the hybrid bracket to reduce, torsion of the hybrid bracket during a collision. A bracket support element can support the hybrid bracket to reduce, shear forces where the bracket is attached to the vehicle frame.

A hybrid beam, a hybrid bracket, a beam reinforcement, and/or a bracket support element can include a hole, or cavity. A hole, or cavity, can include an enlarged, shaped, and/or beveled section. An enlarged, shaped, and/or beveled section can allow for a fastener to be countersunk, such that the fastener can be flush with the adjacent surface when assembled.

A hybrid UPD can be manufactured in various manners. For example, formation of a hybrid UPD can include forming each of the individual components of the hybrid UPD and then assembling the components together, e.g., the method can include forming a preform member; and/or forming a thermoplastic beam; and/or forming a thermoplastic beam section; and/or forming a support sleeve; and/or forming a reinforcing plate; and/or forming a pocket in a mating portion; and/or forming a mating portion and/or forming a hybrid bracket and/or forming a bracket support element. In an embodiment, a thermoplastic beam or thermoplastic beam section can be formed onto a preform member. In an embodiment, a mating portion can be formed onto a reinforcing plate. In an embodiment, a mating portion can be formed onto a support sleeve and/or a mechanical attachment, e.g., a fastener, can be formed onto a mating portion. In an embodiment, a polymeric portion of a hybrid bracket can be formed over a reinforcement.

A forming operation can include extruding, thermoforming, molding (such as blow molding, compression molding, injection molding, overmolding, co-molding, insert molding, and the like), bending, pressing, machining, and similar operations.

A hybrid UPD can be assembled together several manners. An example can include attaching thermoplastic beam sections to form a thermoplastic beam and/or inserting a support sleeve into a pocket in the thermoplastic beam and/or inserting the thermoplastic beam into the channel of the preform member and/or inserting the central portion of the mating portion into the channel of the preform member. Further assembly can include extending a fastener through the thermoplastic beam and the preform member and/or extending a fastener through a hole of the reinforcing plate and into a cavity of the mating portion and/or extending a fastener through a hole of a reinforcing plate and through a hole of a support sleeve and/or extending a fastener through a hole of a reinforcing plate and a hole of a mating portion and/or securing a fastener and/or torqueing a fastener. Additional assembly can include attaching a reinforcement to a polymeric portion of the hybrid bracket; and/or attaching a beam support to a hybrid bracket and/or attaching a hybrid bracket to a vehicle attachment element.

UPD's as described herein can at least partially occlude a passage to a space under the underbody from outside of the vehicle. UPD's as described herein can weigh 15% to 30% less than UPD's constructed of metal, for example, 20% to 25% less. These UPD's can meet the requirements ECE-R93) and can protect a shorter vehicle (e.g. vehicle with a lower, or no front bumper, such as a car, passenger vehicle, light truck, sport utility vehicle, and the like) from under-running the front bumper of a larger vehicle (e.g., light industrial and commercial vehicles).

Possible polymer materials that can be used in the manufacture of the hybrid UPD and the elements thereof include thermoplastic resins. Thermoplastic resins that can be employed include, but are not limited to, oligomers, polymers, ionomers, dendrimers, copolymers such as graft copolymers, block copolymers (e.g., star block copolymers, random copolymers, and the like) and combinations comprising at least one of the foregoing. Examples of such thermoplastic resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidones, polycarboranes, polyoxabicyclononanes, polydibenzofurans, polyphthalamide, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazanes, polysiloxanes, fluoropolymers (e.g., polyvinyl fluouride (PVF), polyvinylidene fluoride (PVDF), polyvinyl fluoride (PVF), fluorinated ethylene-propylene (FEP), polyethylene tetrafluoroethylene (ETFE)) and combinations comprising at least one of the foregoing.

More particularly, the thermoplastic resin which can be used in the hybrid UPD and elements thereof can include polycarbonate resins (e.g., Lexan™ resins, commercially available from SABIC's Innovative Plastics business), polyphenylene ether-polystyrene resins (e.g., Noryl™ resins, commercially available from SABIC's Innovative Plastics business), polyetherimide resins (e.g., Ultem™ resins, commercially available from SABIC's Innovative Plastics business), polybutylene terephthalate-polycarbonate resins (e.g., Xenoy™ resins, commercially available from SABIC's Innovative Plastics business), copolyestercarbonate resins (e.g. Lexan™ SLX resins, commercially available from SABIC's Innovative Plastics business), and combinations comprising at least one of the foregoing resins. Even more particularly, the thermoplastic resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate), and combinations comprising at least one of the foregoing, for example, a combination of branched and linear polycarbonate.

The polymer material can include various additives ordinarily incorporated into polymer compositions of this type, with the proviso that the additive(s) are selected so as to not significantly adversely affect the desired properties of the sheet, in particular, deflection, stress, and flexural stiffness. Such additives can be mixed at a suitable time during the forming of the components. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as carbon black and organic dyes), surface effect additives, radiation stabilizers (e.g., infrared absorbing), flame retardants, and anti-drip agents. A combination of additives can be used, for example a combination of a heat stabilizer, mold release agent, and ultraviolet light stabilizer. The total amount of additives (other than any impact modifier, filler, or reinforcing agents) can be 0.001 wt. % to 5 wt. %, based on the total weight of the composition of the plastic component (e.g., the mating portion of the thermoplastic beam or the plastic portion of the hybrid bracket).

In addition to flexural stiffness, deflection, and lower edge stress, the polymeric material can be chosen to exhibit sufficient impact resistance such that the plastic can resist breakage (e.g., cracking, fracture, and the like) caused by a vehicle impact.

Any of the foregoing polymer materials can be used in a reinforced composite polymer material with the incorporation of reinforcing material.

Figure 14:
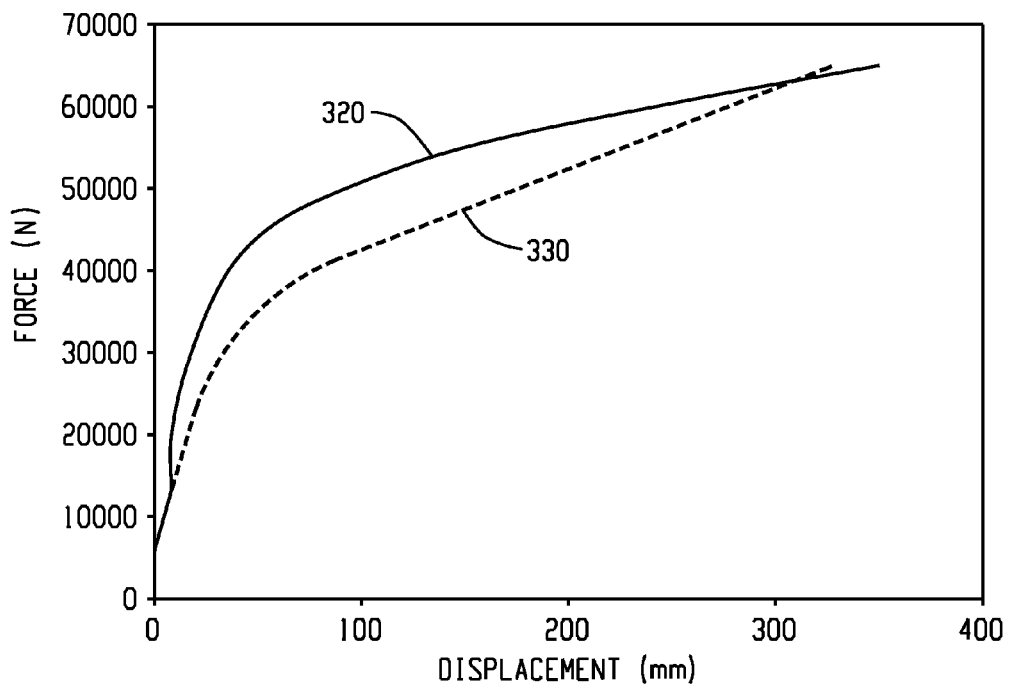
FIG. 14 is an illustration of a graph of simulation results of a corner impact test of an UPC.

FIG. 14 depicts a graph showing the force versus displacement results for a corner load impact of a hybrid UPD as described herein, in comparison to a steel UPD. The results are derived from a computer simulation applying a 65 kiloNewton (kN) force centered on the hybrid beam of the UPD at a distance of 200 millimeters (mm) from an end of the hybrid beam. The simulation included a steel reinforcement member 40 and steel beam reinforcement 30 as well as a long glass fiber reinforced polypropylene thermoplastic beam 60. The simulation parameters were consistent with ECE R-93 where point P1 is located up to 200 mm from the longitudinal planes tangential to the outermost points of the tires on the front axle, excluding the bulging of the tires close to the ground. For the steel UPD represented by curve 320, the displacement at 65 kN was 351 mm, while for the hybrid UPD, represented by curve 330, the displacement at 65 kN was 330 mm. This result represents a 21 mm reduction in displacement due to a corner load impact of 65 kN in comparison to a steel UPD.

Figure 15:
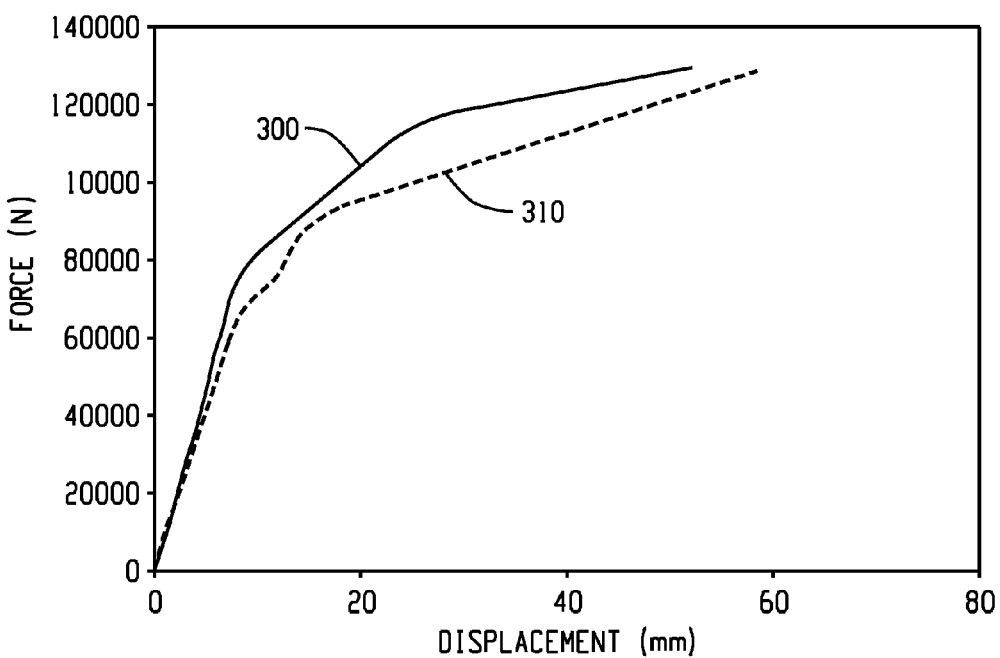
FIG. 15 is an illustration of a graph of simulation results of a support impact test of an UPC.

FIG. 15 depicts a graph showing the force versus displacement results for a support load impact of a hybrid UPD as described herein, in comparison to a steel UPD. The results are from a computer simulation applying a 130 kN force to the hybrid beam at a distance of 350 mm from an end, centered in front of the vehicle side rail. The simulation parameters were consistent with ECE R-93 where points P2 are symmetrical to the median longitudinal plane of the vehicle at a distance from each other of 700 to 1,200 mm inclusive. For the steel UPD represented by curve 300, the displacement at 130 kN was 53 mm, while for the hybrid UPD, represented by curve 310, the displacement at 130 kN was 62 mm. This result represents a 9 mm increase in displacement due to a support load impact of 130 kN in comparison to a steel UPD. The simulated displacement still met the requirements of ECE-R93.

Embodiment 1

An underrun protection device for a vehicle comprising: a hybrid beam formed of a preform member and a thermoplastic formed onto the preform member, and configured to attach to a vehicle attachment element, the hybrid beam comprising: the preform member, which defines a channel and is configured to couple with the vehicle and extend along a side of the vehicle (e.g., extend along a substantial portion of the side) parallel with a centerline of the vehicle, with an opening of the channel oriented away from the centerline, wherein the channel is defined by an inside surface at least partially facing away from the centerline, and an outside surface at least partially facing the centerline; and a thermoplastic beam formed of the thermoplastic and shaped to conform to the channel of the preform member, the thermoplastic beam at least partially abutting the inside surface of the channel, the thermoplastic beam defining a pattern of interstices defined by ribs, with the ribs extending perpendicular to the centerline; wherein the hybrid beam is configured to couple with the vehicle at least partially below an underbody of the vehicle, to at least partially occlude a passage to a space under the underbody from outside of the vehicle.

Embodiment 2

The underrun protection device of Embodiment 1, comprising a reinforcing plate coupled to a front of the thermoplastic beam.

Embodiment 3

The underrun protection device of any of Embodiments 1-2, comprising a fastener extending through the reinforcing plate and the thermoplastic beam and fastening each to the other.

Embodiment 4

The underrun protection device of any of Embodiments 2-3, wherein the reinforcing plate and the thermoplastic beam are friction fit together.

Embodiment 5

The underrun protection device of any of Embodiments 1-4, wherein the thermoplastic beam comprises multiple sections, wherein the sections are spaced apart from one another and not attached to one another, and wherein a foam material is disposed between the sections.

Embodiment 6

The underrun protection device of any of Embodiments 1-4, wherein the thermoplastic beam comprises multiple sections, wherein the sections are attached together by a mechanical joint between end portions of the sections.

Embodiment 7

The underrun protection device of Embodiment 6, wherein the mechanical joint is selected from a lap joint, an interlocking joint, a butt joint, or a combination comprising at least one of the foregoing.

Embodiment 8

The underrun protection device of Embodiment 6, comprising a strap spanning a joint and coupled to each element coupled by the joint.

Embodiment 9

The underrun protection device of Embodiment 1, wherein the thermoplastic beam is overmolded over the preform member.

Embodiment 10

The underrun protection device of any of Embodiments 1-9, wherein the mating portion comprises ribs extending along a depth of the mating portion.

Embodiment 11

The underrun protection device of any of Embodiments 1-10, wherein the mating portion comprises a pocket, and wherein a support sleeve including a hole therethrough is disposed in the pocket.

Embodiment 12

The underrun protection device of any of Embodiments 1-11, wherein the hybrid beam is attached to a bracket attached to a vehicle frame.

Embodiment 13

The underrun protection device of Embodiment 12, wherein the bracket comprises a metal, a polymer, a reinforced composite polymer, or a combination comprising at least one of the foregoing.

Embodiment 14

The underrun protection device of any of Embodiments 12-13, wherein the bracket comprises a polymer portion and a reinforcement; and wherein the reinforcement is molded into at least a portion of the polymer portion.

Embodiment 15

The underrun protection device of Embodiment 14, wherein the polymer portion comprises ribs extending perpendicular to the ribs of the thermoplastic beam.

Embodiment 16

The underrun protection device of any of Embodiments 1-15, further comprising a beam reinforcement coupled to an outside surface of the preform member.

Embodiment 17

The underrun protection device of any of Embodiments 1-16, wherein the hybrid beam is attached to two or more brackets, wherein the brackets are identical and interchangeable such that any one of the two or more brackets can be disposed in mechanical communication with the hybrid beam anywhere along the length of the beam, wherein the brackets are not configured with a specific chirality.

Embodiment 18

The underrun protection device of any of Embodiments 1-17, wherein the hybrid beam has a length measured in a x-axis dimension of 1,000 mm to 3,000 mm, a height measured in a y-axis dimension of 80 mm to 300 mm, and a depth measured in a z-axis dimension of 80 mm to 200 mm.

Embodiment 19

The underrun protection device of any of Embodiments 1-18, wherein the preform member comprises a metal, a polymer, a reinforced composite polymer, or a combination comprising at least one of the foregoing.

Embodiment 20

The underrun protection device of any of Embodiments 1-18, wherein the thermoplastic beam comprises a metal, a polymer, a reinforced composite polymer, or a combination comprising at least one of the foregoing.

Embodiment 21

The underrun protection device of any of Embodiments 2-18 wherein the reinforcing plate comprises a metal, a polymer, a reinforced composite polymer, or a combination comprising at least one of the foregoing.

Embodiment 22

The underrun protection device of any of Embodiments 16-21 wherein the beam reinforcement comprises a metal, a polymer, a reinforced composite polymer, or a combination comprising at least one of the foregoing.

Embodiment 23

A vehicle comprising: at least one of a front bumper, a rear bumper, and a side rail; and an underrun protection device of any of Embodiments 1-22 and 31, wherein the underrun protection device is positioned below one of the front bumper, the rear bumper, or the side rail.

Embodiment 24

A method of manufacturing an underrun protection device comprising: forming an hybrid beam configured for attachment to a vehicle attachment element comprising: a preform member including a channel and an inside surface; and a thermoplastic beam, wherein the thermoplastic beam comprises a mating portion, wherein the thermoplastic beam and the preform member have complementary mating shapes such that a portion of the mating portion is adjacent to the inside surface of the channel, and wherein the thermoplastic beam is affixed to the preform member.

Embodiment 25

The method of Embodiment 24, wherein the preform member and the thermoplastic beam are formed separately and assembled together into a hybrid beam.

Embodiment 26

The method of Embodiment 24, further comprising molding the thermoplastic beam to the preform member.

Embodiment 27

The method of any of Embodiments 24-26, wherein a reinforcing plate is disposed adjacent a front side of the mating portion.

Embodiment 28

The method of any of Embodiments 24-27, further comprising forming a hybrid bracket configured for attachment to the vehicle and to the hybrid beam, wherein the hybrid bracket comprises a reinforcement and a polymeric portion.

Embodiment 29

The method of any of Embodiments 24-28, wherein the polymeric portion is molded to a reinforcement.

Embodiment 30

A underrun protection device for a vehicle comprising: a hybrid beam comprising: a preform member including a channel and an open side; a thermoplastic beam comprising a mating portion, a reinforcing plate, wherein the preform member and the thermoplastic beam have complementary mating shapes such that a portion of the thermoplastic beam can fit inside the channel of the preform member; wherein the mating portion comprises ribs; and wherein the hybrid beam is configured to attached to a bracket comprising a reinforcement and a polymeric portion; and wherein the bracket is attached to a vehicle attachment element.

Embodiment 31

The underrun protection device of any of Embodiments 1-22, wherein extending along a substantial portion of the side of the vehicle comprises extending along greater than or equal to 60% of the side of the vehicle, or greater than or equal to 70% of the side of the vehicle, or greater than or equal to 80% of the side of the vehicle, or greater than or equal to 90% of the side of the vehicle.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless specified herein to the contrary, the date of each standard relied upon herein is the most recent version of the standard as of Feb. 28, 2014.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. An underrun protection device for a vehicle comprising:
 a hybrid beam formed of a preform member and a thermoplastic formed onto the preform member, and configured to attach to a vehicle attachment element, the hybrid beam comprising:
  the preform member, which defines a channel and is configured to couple with the vehicle and extend along a substantial portion of a side of the vehicle parallel with a centerline of the vehicle, with an opening of the channel configured to orient away from the centerline, wherein the channel is defined by an inside surface configured to at least partially face away from the centerline, and an outside surface configured to at least partially face the centerline;
  a thermoplastic beam formed of the thermoplastic and shaped to conform to the channel of the preform member, the thermoplastic beam at least partially abutting the inside surface of the channel, the thermoplastic beam defining a pattern of interstices defined by ribs, with the ribs extending perpendicular to the inside surface of the channel;
  a reinforcing plate coupled to a front of the thermoplastic beam, wherein the reinforcing plate and the thermoplastic beam are friction fit together; and
  a fastener extending through the reinforcing plate and the thermoplastic beam and fastening each to the other;
  wherein the hybrid beam is configured to couple with the vehicle at least partially below an underbody of the vehicle, to at least partially occlude a passage to a space under the underbody from outside of the vehicle.

2. An underrun protection device for a vehicle comprising:
 a hybrid beam formed of a preform member and a thermoplastic formed onto the preform member, and configured to attach to a vehicle attachment element, the hybrid beam comprising:
  the preform member, which defines a channel and is configured to couple with the vehicle and extend along a substantial portion of a side of the vehicle parallel with a centerline of the vehicle, with an opening of the channel configured to orient away from the centerline, wherein the channel is defined by an inside surface configured to at least partially face away from the centerline, and an outside surface configured to at least partially face the centerline; and
  a thermoplastic beam formed of the thermoplastic and shaped to conform to the channel of the preform member, the thermoplastic beam at least partially abutting the inside surface of the channel, the thermoplastic beam defining a pattern of interstices defined by ribs, with the ribs extending perpendicular to the inside surface of the channel, wherein the thermoplastic beam
   comprises multiple sections, wherein the sections are attached together by a mechanical joint between end portions of the sections; and wherein the mechanical joint is selected from a lap joint, an interlocking joint, a butt joint, or a combination comprising at least one of the foregoing; or
   comprises a strap spanning a joint and coupled to each element coupled by the joint;

wherein the hybrid beam is configured to couple with the vehicle at least partially below an underbody of the vehicle, to at least partially occlude a passage to a space under the underbody from outside of the vehicle.

3. The underrun protection device of claim 2, comprising a reinforcing plate coupled to a front of the thermoplastic beam, wherein the reinforcing plate and the thermoplastic beam are friction fit together.

4. The underrun protection device of claim 2, wherein the thermoplastic beam comprises multiple sections, wherein the sections are spaced apart from one another and not attached to one another, and wherein a foam material is disposed between the sections.

5. The underrun protection device of claim 2, wherein the thermoplastic beam comprises a mating portion, wherein the mating portion comprises a pocket, and wherein a support sleeve including a hole therethrough is disposed in the pocket.

6. The underrun protection device of claim 2, wherein the hybrid beam is attached to a bracket attached to a vehicle frame.

7. The underrun protection device of claim 2, further comprising a beam reinforcement coupled to an outside surface of the preform member.

8. The underrun protection device of claim 2, wherein the hybrid beam is attached to two or more brackets, wherein the brackets are identical and interchangeable such that any one of the two or more brackets can be disposed in mechanical communication with the hybrid beam anywhere along the length of the beam, wherein the brackets are not configured with a specific chirality.

9. The underrun protection device of claim 2, wherein the hybrid beam has a length measured in a x-axis dimension of 1,000 mm to 3,000 mm, a height measured in a y-axis dimension of 80 mm to 300 mm, and a depth measured in a z-axis dimension of 80 mm to 200 mm.

10. The underrun protection device of claim 2, wherein the preform member comprises a metal, a polymer, a reinforced composite polymer, or a combination comprising at least one of the foregoing; and/or
wherein the thermoplastic beam comprises a metal, a polymer, a reinforced composite polymer, or a combination comprising at least one of the foregoing; and/or
wherein the thermoplastic beam comprises a reinforcing plate, wherein the reinforcing plate comprises a metal, a polymer, a reinforced composite polymer, or a combination comprising at least one of the foregoing.

11. A vehicle comprising:
at least one of a front bumper, a rear bumper, and a side rail; and
an underrun protection device of claim 2, wherein the underrun protection device is positioned below one of the front bumper, the rear bumper, or the side rail.

12. An underrun protection device for a vehicle comprising:
a hybrid beam formed of a preform member and a thermoplastic formed onto the preform member, and configured to attach to a vehicle attachment element, the hybrid beam comprising:
the preform member, which defines a channel and is configured to couple with the vehicle and extend along a substantial portion of a side of the vehicle parallel with a centerline of the vehicle, with an opening of the channel configured to orient away from the centerline, wherein the channel is defined by an inside surface configured to at least partially face away from the centerline, and an outside surface configured to at least partially face the centerline;
a thermoplastic beam formed of the thermoplastic and shaped to conform to the channel of the preform member, the thermoplastic beam at least partially abutting the inside surface of the channel, the thermoplastic beam defining a pattern of interstices defined by ribs, with the ribs extending perpendicular to the inside surface of the channel;
a reinforcing plate coupled to a front of the thermoplastic beam, wherein the reinforcing plate and the thermoplastic beam are friction fit together; and
wherein the hybrid beam is attached to a bracket attached to a vehicle frame;
wherein the bracket comprises a polymer portion and a reinforcement;
wherein the reinforcement is molded into at least a portion of the polymer portion;
wherein the hybrid beam is configured to couple with the vehicle at least partially below an underbody of the vehicle, to at least partially occlude a passage to a space under the underbody from outside of the vehicle.

13. The underrun protection device of claim 12, wherein the polymer portion comprises ribs extending perpendicular to the ribs of the thermoplastic beam.

* * * * *